United States Patent
Reeves et al.

(10) Patent No.: US 8,966,379 B2
(45) Date of Patent: Feb. 24, 2015

(54) DYNAMIC CROSS-ENVIRONMENT APPLICATION CONFIGURATION/ORIENTATION IN AN ACTIVE USER ENVIRONMENT

(75) Inventors: Brian Reeves, Hamilton (CA); Paul E. Reeves, Oakville (CA); Wuke Liu, Mississauga (CA); Borys Sushchev, Mississauga (CA)

(73) Assignee: Z124, George Town (KY)

( * ) Notice: Subject to any disclaimer, the term of this patent is extended or adjusted under 35 U.S.C. 154(b) by 0 days.

(21) Appl. No.: 13/399,936

(22) Filed: Feb. 17, 2012

(65) Prior Publication Data
US 2013/0019183 A1 Jan. 17, 2013

Related U.S. Application Data

(60) Provisional application No. 61/389,117, filed on Oct. 1, 2010, provisional application No. 61/507,199, filed on Jul. 13, 2011, provisional application No. 61/507,201, filed on Jul. 13, 2011, provisional (Continued)

(51) Int. Cl.
*G06F 3/01* (2006.01)
*G06F 9/44* (2006.01)
(Continued)

(52) U.S. Cl.
CPC ............ *G06F 9/4443* (2013.01); *G06F 3/1423* (2013.01); *G06F 3/1454* (2013.01); *G09G 5/14* (2013.01); *G09G 2340/0492* (2013.01); *G09G 2370/047* (2013.01); *G09G 2370/12* (2013.01)
USPC ........... 715/745; 719/312; 345/418; 345/530; 345/541; 345/158; 715/746; 715/770

(58) Field of Classification Search
CPC ...................... H04M 2250/12; H04M 1/72522; G06F 2200/1614; G06F 2200/1637
USPC ........... 345/158, 659; 715/746, 249, 779, 740
See application file for complete search history.

(56) References Cited

U.S. PATENT DOCUMENTS

| | | | |
|---|---|---|---|
| 5,396,630 | A | 3/1995 | Banda et al. |
| 5,673,403 | A | 9/1997 | Brown et al. |

(Continued)

FOREIGN PATENT DOCUMENTS

| | | |
|---|---|---|
| JP | 7219903 | 8/1995 |
| JP | 08115144 | 5/1996 |

(Continued)

OTHER PUBLICATIONS

"Lapdock™ for Motorola Atrix," at http://wwvv.motorola.com/Consumers/US-EN/Consumer-Product-and-Services/Mobile . . . , accessed Apr. 18, 2011, 1 page.

(Continued)

*Primary Examiner* — Amy Ng
*Assistant Examiner* — Sang H Kim
(74) *Attorney, Agent, or Firm* — Sheridan Ross P.C.

(57) ABSTRACT

Dynamic configuration of cross-environment applications enhances the computing experience in a computing environment with an extended active user environment and/or multiple active user environments. A mobile computing device maintains multiple active device configurations associated with multiple active user environments and/or application windows within active user environments. Device configuration qualifiers are determined from a variety of sources including device characteristics, device indicators, user settings, and/or application presentation. The mobile computing device selects active resource sets for applications based on the device configuration qualifiers. Application presentation is dynamically updated by disestablishing an application screen and establishing a new active application screen using a different resource set. The mobile computing device may be a smartphone running the Android mobile operating system and a full desktop Linux distribution on a modified Android kernel.

20 Claims, 15 Drawing Sheets

Related U.S. Application Data application No. 61/507,203, filed on Jul. 13, 2011, provisional application No. 61/507,206, filed on Jul. 13, 2011, provisional application No. 61/507,209, filed on Jul. 13, 2011.

(51) Int. Cl.
  *G06F 3/14* (2006.01)
  *G09G 5/14* (2006.01)

(56) References Cited

U.S. PATENT DOCUMENTS

| | | |
|---|---|---|
| 5,764,984 A | 6/1998 | Loucks |
| 5,874,928 A | 2/1999 | Kou |
| 6,108,715 A | 8/2000 | Leach et al. |
| 6,157,959 A | 12/2000 | Bonham et al. |
| 6,178,503 B1 | 1/2001 | Madden et al. |
| 6,182,158 B1 | 1/2001 | Kougiouris et al. |
| 6,260,075 B1 | 7/2001 | Cabrero et al. |
| 6,477,585 B1 | 11/2002 | Cohen et al. |
| 6,486,890 B1 | 11/2002 | Harada et al. |
| 6,507,336 B1 | 1/2003 | Lunsford |
| 6,573,913 B1 | 6/2003 | Butler et al. |
| 6,694,368 B1 | 2/2004 | An et al. |
| 6,826,703 B2 | 11/2004 | Kawano et al. |
| 6,917,963 B1 | 7/2005 | Hipp et al. |
| 6,927,908 B2 | 8/2005 | Stark |
| 6,961,941 B1 | 11/2005 | Nelson et al. |
| 6,970,173 B2 | 11/2005 | Ciolac |
| 7,007,240 B1 | 2/2006 | Anderson et al. |
| 7,069,519 B1 | 6/2006 | Okude et al. |
| 7,127,723 B2 | 10/2006 | Endo et al. |
| 7,284,203 B1 | 10/2007 | Meeks et al. |
| 7,453,465 B2 | 11/2008 | Schmieder et al. |
| 7,478,341 B2 | 1/2009 | Dove |
| 7,489,503 B2 | 2/2009 | Maatta |
| 7,565,535 B2 | 7/2009 | Roberts et al. |
| 7,681,134 B1 | 3/2010 | Grechishkin et al. |
| 7,705,799 B2 | 4/2010 | Niwa |
| 7,880,728 B2 | 2/2011 | de los Reyes et al. |
| 7,949,633 B1 | 5/2011 | Shaver et al. |
| 7,950,008 B2 | 5/2011 | Bhide et al. |
| 7,960,945 B1 | 6/2011 | Onorato et al. |
| 8,194,001 B2 | 6/2012 | Miller et al. |
| 8,397,245 B2 | 3/2013 | Filali-Adib et al. |
| 8,704,777 B2 | 4/2014 | Small et al. |
| 2002/0010844 A1 | 1/2002 | Noel et al. |
| 2002/0130888 A1 | 9/2002 | Perry et al. |
| 2002/0157001 A1 | 10/2002 | Huang et al. |
| 2002/0158811 A1 | 10/2002 | Davis |
| 2003/0001848 A1 | 1/2003 | Doyle et al. |
| 2003/0020954 A1 | 1/2003 | Udom et al. |
| 2003/0079010 A1 | 4/2003 | Osborn |
| 2003/0079205 A1 | 4/2003 | Miyao et al. |
| 2003/0115443 A1 | 6/2003 | Cepulis et al. |
| 2003/0131143 A1 | 7/2003 | Myers |
| 2003/0174172 A1 | 9/2003 | Conrad et al. |
| 2003/0177285 A1 | 9/2003 | Hunt et al. |
| 2003/0179541 A1 | 9/2003 | Sullivan |
| 2003/0226116 A1 | 12/2003 | Kuwata et al. |
| 2004/0137855 A1 | 7/2004 | Wiley et al. |
| 2004/0141085 A1 | 7/2004 | Nickel et al. |
| 2004/0226023 A1 | 11/2004 | Tucker |
| 2005/0083642 A1 | 4/2005 | Senpuku et al. |
| 2005/0193267 A1 | 9/2005 | Liu et al. |
| 2005/0237587 A1 | 10/2005 | Nakamura |
| 2005/0246505 A1 | 11/2005 | McKenney et al. |
| 2005/0248501 A1 | 11/2005 | Kim |
| 2006/0005187 A1 | 1/2006 | Neil |
| 2006/0010314 A1 | 1/2006 | Xu |
| 2006/0031572 A1 | 2/2006 | Feuerstein et al. |
| 2006/0107020 A1 | 5/2006 | Stillwell, Jr. et al. |
| 2006/0136828 A1 | 6/2006 | Asano |
| 2006/0139862 A1 | 6/2006 | Wang et al. |
| 2006/0183505 A1 | 8/2006 | Willrich |
| 2006/0187142 A1 | 8/2006 | Lesniak |
| 2006/0227806 A1 | 10/2006 | Tseng |
| 2006/0248404 A1 | 11/2006 | Lindsay et al. |
| 2007/0005661 A1 | 1/2007 | Yang |
| 2007/0014295 A1 | 1/2007 | Fernandes et al. |
| 2007/0022155 A1 | 1/2007 | Owens et al. |
| 2007/0033260 A1 | 2/2007 | Grouzdev et al. |
| 2007/0067769 A1 | 3/2007 | Geisinger |
| 2007/0085759 A1 | 4/2007 | Lee et al. |
| 2007/0111750 A1 | 5/2007 | Stohr et al. |
| 2007/0136356 A1 | 6/2007 | Smith et al. |
| 2007/0156729 A1 | 7/2007 | Shaylor |
| 2007/0182663 A1 | 8/2007 | Biech |
| 2007/0198760 A1 | 8/2007 | Han |
| 2007/0271522 A1 | 11/2007 | Son et al. |
| 2007/0285401 A1 | 12/2007 | Ohki et al. |
| 2007/0288941 A1 | 12/2007 | Dunshea et al. |
| 2008/0024388 A1 | 1/2008 | Bruce |
| 2008/0057910 A1 | 3/2008 | Thoresson et al. |
| 2008/0062625 A1 | 3/2008 | Batio |
| 2008/0082815 A1 | 4/2008 | Kawano et al. |
| 2008/0090525 A1 | 4/2008 | Joo |
| 2008/0119237 A1 | 5/2008 | Kim |
| 2008/0119731 A1 | 5/2008 | Becerra et al. |
| 2008/0126762 A1 | 5/2008 | Kelley et al. |
| 2008/0134061 A1 | 6/2008 | Banerjee et al. |
| 2008/0155103 A1 | 6/2008 | Bailey |
| 2008/0244599 A1* | 10/2008 | Hodson et al. ............... 718/104 |
| 2008/0291283 A1 | 11/2008 | Achiwa et al. |
| 2008/0299951 A1 | 12/2008 | Karkanias et al. |
| 2009/0037649 A1 | 2/2009 | Xu |
| 2009/0055749 A1 | 2/2009 | Chatterjee et al. |
| 2009/0083829 A1 | 3/2009 | Peterson |
| 2009/0089569 A1 | 4/2009 | Baribault et al. |
| 2009/0100429 A1 | 4/2009 | Thoelke et al. |
| 2009/0109468 A1 | 4/2009 | Barclay et al. |
| 2009/0119580 A1* | 5/2009 | Rohrabaugh et al. ......... 715/249 |
| 2009/0138818 A1 | 5/2009 | Nemoto |
| 2009/0158299 A1 | 6/2009 | Carter |
| 2009/0164930 A1 | 6/2009 | Chen et al. |
| 2009/0176571 A1 | 7/2009 | Sternberg |
| 2009/0217071 A1 | 8/2009 | Huang et al. |
| 2009/0219254 A1 | 9/2009 | Lai et al. |
| 2009/0249247 A1 | 10/2009 | Tseng et al. |
| 2009/0249331 A1 | 10/2009 | Davis et al. |
| 2009/0256780 A1 | 10/2009 | Small et al. |
| 2009/0257657 A1 | 10/2009 | Temmermans et al. |
| 2009/0278806 A1 | 11/2009 | Duarte et al. |
| 2009/0305743 A1 | 12/2009 | Gouesbet et al. |
| 2009/0313440 A1 | 12/2009 | Kim et al. |
| 2009/0327560 A1 | 12/2009 | Yalovsky |
| 2010/0005396 A1 | 1/2010 | Nason et al. |
| 2010/0007603 A1 | 1/2010 | Kirkup |
| 2010/0013863 A1 | 1/2010 | Harris |
| 2010/0046026 A1 | 2/2010 | Heo |
| 2010/0049775 A1 | 2/2010 | Rajawat |
| 2010/0060549 A1 | 3/2010 | Tsern |
| 2010/0063994 A1 | 3/2010 | Cook et al. |
| 2010/0064228 A1* | 3/2010 | Tsern ............................. 715/740 |
| 2010/0064244 A1 | 3/2010 | Kilpatrick, II et al. |
| 2010/0064536 A1 | 3/2010 | Caskey et al. |
| 2010/0066763 A1 | 3/2010 | Macdougall et al. |
| 2010/0079355 A1 | 4/2010 | Kilpatrick, II et al. |
| 2010/0085274 A1 | 4/2010 | Kilpatrick, II et al. |
| 2010/0085301 A1 | 4/2010 | Cohen et al. |
| 2010/0085382 A1 | 4/2010 | Lundqvist et al. |
| 2010/0097386 A1 | 4/2010 | Kim et al. |
| 2010/0107163 A1 | 4/2010 | Lee |
| 2010/0122271 A1 | 5/2010 | Labour et al. |
| 2010/0149121 A1 | 6/2010 | Alexander et al. |
| 2010/0157518 A1 | 6/2010 | Ladouceur et al. |
| 2010/0164836 A1 | 7/2010 | Liberatore |
| 2010/0177019 A1 | 7/2010 | Jeong et al. |
| 2010/0177047 A1 | 7/2010 | Brenneman et al. |
| 2010/0207903 A1 | 8/2010 | Kim et al. |
| 2010/0211769 A1 | 8/2010 | Shankar et al. |
| 2010/0245256 A1 | 9/2010 | Estrada et al. |
| 2010/0246119 A1 | 9/2010 | Collopy et al. |

(56) References Cited

U.S. PATENT DOCUMENTS

| | | | |
|---|---|---|---|
| 2010/0250975 A1 | 9/2010 | Gill et al. | |
| 2010/0251233 A1 | 9/2010 | Majewski et al. | |
| 2010/0319008 A1 | 12/2010 | Ho | |
| 2010/0321275 A1 | 12/2010 | Hinckley et al. | |
| 2011/0012858 A1 | 1/2011 | Brookes et al. | |
| 2011/0016299 A1 | 1/2011 | Galicia et al. | |
| 2011/0016301 A1 | 1/2011 | Galicia et al. | |
| 2011/0018901 A1 | 1/2011 | Boorman et al. | |
| 2011/0025625 A1 | 2/2011 | Hirako | |
| 2011/0034214 A1 | 2/2011 | Hong et al. | |
| 2011/0063192 A1 | 3/2011 | Miller et al. | |
| 2011/0093691 A1 | 4/2011 | Galicia et al. | |
| 2011/0093836 A1* | 4/2011 | Galicia et al. | 717/139 |
| 2011/0096014 A1 | 4/2011 | Fuyuno et al. | |
| 2011/0102314 A1 | 5/2011 | Roux | |
| 2011/0113329 A1 | 5/2011 | Pusateri | |
| 2011/0115737 A1 | 5/2011 | Fuyuno et al. | |
| 2011/0126216 A1 | 5/2011 | Galicia et al. | |
| 2011/0167492 A1 | 7/2011 | Ghosh et al. | |
| 2011/0193806 A1 | 8/2011 | Kim et al. | |
| 2011/0209102 A1 | 8/2011 | Hinckley et al. | |
| 2011/0210922 A1 | 9/2011 | Griffin | |
| 2011/0216064 A1 | 9/2011 | Dahl et al. | |
| 2011/0225538 A1 | 9/2011 | Oyagi et al. | |
| 2011/0239142 A1 | 9/2011 | Steeves et al. | |
| 2011/0246904 A1 | 10/2011 | Pinto et al. | |
| 2011/0260997 A1 | 10/2011 | Ozaki | |
| 2011/0267478 A1 | 11/2011 | Jacobs | |
| 2011/0273464 A1 | 11/2011 | Brunner et al. | |
| 2011/0273475 A1 | 11/2011 | Herz et al. | |
| 2011/0289444 A1 | 11/2011 | Winsky | |
| 2011/0291964 A1 | 12/2011 | Chambers et al. | |
| 2011/0312349 A1 | 12/2011 | Forutanpour | |
| 2012/0005602 A1 | 1/2012 | Anttila et al. | |
| 2012/0005691 A1 | 1/2012 | Wong et al. | |
| 2012/0026069 A1 | 2/2012 | Ohsaki | |
| 2012/0060089 A1 | 3/2012 | Heo et al. | |
| 2012/0076197 A1 | 3/2012 | Byford et al. | |
| 2012/0081278 A1 | 4/2012 | Freedman | |
| 2012/0081353 A1 | 4/2012 | Yusupov et al. | |
| 2012/0081354 A1 | 4/2012 | Yusupov et al. | |
| 2012/0081380 A1 | 4/2012 | Reeves et al. | |
| 2012/0081383 A1 | 4/2012 | Reeves et al. | |
| 2012/0081396 A1 | 4/2012 | Yusupov et al. | |
| 2012/0084480 A1 | 4/2012 | Reeves et al. | |
| 2012/0084481 A1 | 4/2012 | Reeves et al. | |
| 2012/0084542 A1 | 4/2012 | Reeves et al. | |
| 2012/0084675 A1 | 4/2012 | Sirpal et al. | |
| 2012/0084697 A1 | 4/2012 | Reeves | |
| 2012/0084791 A1 | 4/2012 | Benedek et al. | |
| 2012/0084792 A1 | 4/2012 | Benedek et al. | |
| 2012/0084793 A1 | 4/2012 | Reeves et al. | |
| 2012/0084798 A1 | 4/2012 | Reeves et al. | |
| 2012/0086716 A1 | 4/2012 | Reeves et al. | |
| 2012/0086717 A1 | 4/2012 | Liu | |
| 2012/0089906 A1 | 4/2012 | Reeves et al. | |
| 2012/0089992 A1 | 4/2012 | Reeves et al. | |
| 2012/0094716 A1 | 4/2012 | Reeves | |
| 2012/0172088 A1 | 7/2012 | Kirch et al. | |
| 2012/0176413 A1* | 7/2012 | Kulik et al. | 345/659 |
| 2012/0188185 A1 | 7/2012 | Cassar | |
| 2012/0278747 A1 | 11/2012 | Abraham et al. | |
| 2012/0278750 A1* | 11/2012 | Abraham et al. | 715/779 |
| 2013/0021262 A1 | 1/2013 | Chen | |
| 2013/0024778 A1 | 1/2013 | Reeves et al. | |
| 2013/0024812 A1 | 1/2013 | Reeves et al. | |
| 2013/0076672 A1 | 3/2013 | Sirpal et al. | |
| 2013/0076677 A1 | 3/2013 | Kretz | |
| 2013/0076678 A1 | 3/2013 | Kretz | |
| 2013/0076679 A1 | 3/2013 | Kretz | |
| 2013/0076683 A1 | 3/2013 | Reeves | |
| 2013/0079062 A1 | 3/2013 | Sirpal et al. | |
| 2013/0080945 A1 | 3/2013 | Reeves | |
| 2013/0088411 A1 | 4/2013 | Reeves et al. | |
| 2013/0167159 A1 | 6/2013 | Ricci et al. | |

FOREIGN PATENT DOCUMENTS

| | | |
|---|---|---|
| JP | 2008225546 | 9/2008 |
| KR | 1020020092969 | 12/2002 |
| KR | 100578592 | 5/2006 |
| KR | 1020060081997 | 7/2006 |
| KR | 100616157 | 8/2006 |
| KR | 100883208 | 2/2009 |
| KR | 1020100043434 | 4/2010 |
| WO | WO 2006/075859 | 7/2006 |
| WO | WO 2008132924 | 11/2008 |

OTHER PUBLICATIONS

"Motorola ATRIX 4G Laptop Dock Review," at http://www.phonearena.com/reviews/Motorola-ATRIX-4G-Laptop-Dock-Review_id2667, Mar. 2, 2011, 6 pages.

Burns, C., "Motorola ATRIX 4G Laptop Dock Review," at http://androidcommunity.com/motorola-atrix-4g-laptop-dock-review-20110220/, Feb. 20, 2011, 5 pages.

Catacchio, Chad, "This smartphone has two huge screens . . . that rotate," The Next Web at http://thenextweb.com/asia/2010/10/07/this-smartphone-has-two-huge-screens-that-rotate/, Jul. 21, 2011, 2 pages.

Google images, accessed Apr. 18, 2011, 6 pages.

Harman03, "Kyocera Echo Dual-screen Android Phone," posted 4 weeks from Apr. 18, 2011, 3 pages.

Stein, S., "How does the Motorola Atrix 4G Lapdock compare with a laptop?" Crave—CNET, at http://news.cnet.com/8301-17938_105-20031251-1.html, Feb. 9, 2011, 7 pages.

Sud, et al., "Dynamic Migration of Computation Through Virtualization of the Mobile Platform," Mobile Networks and Applications, 2012, (published online Feb. 22, 2011), vol. 17, Iss. 2, pp. 206-215.

Website entitled, "Kyocera Echo," at www.echobykyocera.com/, 2011, 6 pages.

Website entitled, "Sony Tablet," at www.store.sony.com/webapp/wcs/stores/servlet/CategoryDisplay?catalogId=10551&storeId=10151&langId=-1&categoryId=8198552921644795521, 2011, 3 pages.

International Search Report for International Patent Application No. PCT/US2011/052988, mailed May 3, 2012 (Attorney Ref. No. 6583-391-PCT), 5 pages.

Written Opinion for International Patent Application No. PCT/US2011/052988, mailed May 3, 2012, 4 pages.

International Search Report for International Patent Application No. PCT/US2011/053037, mailed Mar. 20, 2012, 5 pages.

Written Opinion for International Patent Application No. PCT/US2011/053037, mailed Mar. 20, 2012, 6 pages.

International Search Report for International Patent Application No. PCT/US2011/053127, mailed Apr. 24, 2012, 5 pages.

Written Opinion for International Patent Application No. PCT/US2011/053127, mailed Apr. 24, 2012, 4 pages.

International Search Report for International Patent Application No. PCT/US2011/053130, mailed Apr. 24, 2012, 5 pages.

Written Opinion for International Patent Application No. PCT/US2011/053130, mailed Apr. 24, 2012, 4 pages.

International Search Report for International Patent Application No. PCT/US2011/053665, mailed Apr. 30, 2012, 5 pages.

Written Opinion for International Patent Application No. PCT/US2011/053665, mailed Apr. 30, 2012, 4 pages.

International Search Report for International Patent Application No. PCT/US2011/053691, mailed May 4, 2012, 5 pages.

Written Opinion for International Patent Application No. PCT/US2011/053691, mailed May 4, 2012, 4 pages.

International Search Report for International Patent Application No. PCT/US2011/053826, mailed Apr. 27, 2012, 5 pages.

Written Opinion for International Patent Application No. PCT/US2011/053826, mailed Apr. 27, 2012, 4 pages.

International Search Report for International Patent Application No. PCT/US2011/053909, mailed Apr. 30, 2012, 5 pages.

Written Opinion for International Patent Application No. PCT/US2011/053909, mailed Apr. 30, 2012, 4 pages.

(56) References Cited

OTHER PUBLICATIONS

International Search Report for International Patent Application No. PCT/US2011/053923, mailed Apr. 30, 2012, 5 pages.
Written Opinion for International Patent Application No. PCT/US2011/053923, mailed Apr. 30, 2012, 4 pages.
International Search Report for International Patent Application No. PCT/US2011/054017, mailed Apr. 24, 2012, 5 pages.
Written Opinion for International Patent Application No. PCT/US2011/054017, mailed Apr. 24, 2012, 4 pages.
International Search Report for International Patent Application No. PCT/US2011/054019, mailed Apr. 10, 2012, 5 pages.
Written Opinion for International Patent Application No. PCT/US2011/054019, mailed Apr. 10, 2012, 4 pages.
International Search Report for International Patent Application No. PCT/US2011/054605, mailed Apr. 30, 2012, 5 pages.
Written Opinion for International Patent Application No. PCT/US2011/054605, mailed Apr. 30, 2012, 5 pages.
International Search Report for International Patent Application No. PCT/US2011/054623, mailed Apr. 27, 2012, 5 pages.
Written Opinion for International Patent Application No. PCT/US2011/054623, mailed Apr. 27, 2012, 4 pages.
International Search Report for International Patent Application No. PCT/US2011/056149, mailed Apr. 24, 2012, 5 pages.
Written Opinion for International Patent Application No. PCT/US2011/056149, mailed Apr. 24, 2012, 4 pages.
Official Action for U.S. Appl. No. 12/905,920 mailed Dec. 7, 2012, 13 pages.
Official Action for U.S. Appl. No. 12/905,920 mailed Jul. 3, 2012, 14 pages.
Official Action for U.S. Appl. No. 12/905,920 mailed Mar. 15, 2012, 12 pages.
Official Action for U.S. Appl. No. 13/246,669 mailed Jan. 8, 2013, 14 pages.
Official Action for U.S. Appl. No. 13/251,427 mailed Feb. 15, 2013, 18 pages.
U.S. Appl. No. 13/843,086, filed Mar. 15, 2013, Reeves et al.
U.S. Appl. No. 13/485,734, filed May 31, 2012, Reeves.
Google Transliteration IME website, 2010, available at www.google.com/ime/transliteration/help.html#features, 8 pages.
InputKing Online Input System, 2011, available at www.inputking.com, 2 pages.
Dutko, "Domo Arigato Mr Androidato—An Introduction to the New Google Mobile Linux Framework, Android," Linux Journal, Mar. 2008, vol. 2008, Iss. 167, 9 pages.
Mikeclay, "Launch Multiple Programs at Once Using Simple Batch File," Feb. 5, 2009 available at www.web.archive.org/web/20090205134920/http://www.windowsreference.com/windows-2000/launch-multiple-programs-at-once-using-simple-batch-file/, 5 pages.
Sakhr Software—Arabic Optical Character Recognition, Jul. 15, 2011, available at www.sakhr.com/ocr.aspx, 1 page.
Wikipedia, "Balloon help," Jul. 18, 2011, available at www.en.wikipedia.org/wiki/Balloon_help, 3 pages.
Wikipedia, "Google Pinyin," Aug. 27, 2011 available at www.en.wikipedia.org/wiki/Google_Pinyin, 3 pages.
Wikipedia, "Mouseover," Sep. 29, 2011, available at www.en.wikipedia.org/wiki/Mouseover, 2 pages.
Wikipedia, "Predictive text," Aug. 7, 2011, available at www.en.wikipedia.org/wiki/Predictive_test, 6 pages.
Wikipedia, "Sogou Pinyin," Jul. 23, 2011 available at www.en.wikipedia.org/wiki/Sogou_Pinyin, 3 pages.
Wikipedia, "Status bar," Sep. 8, 2011, available at www.en.wikipedia.org/wiki/Status_bar, 3 pages.
Wikipedia, "Tooltip," Sep. 17, 2011, available at www.en.wikipedia.org/wiki/Tooltip, 2 pages.
International Search Report and Written Opinion for International Patent Application No. PCT/US2012/046800, mailed Feb. 20, 2013, 9 pages.
International Search Report and Written Opinion for International Patent Application No. PCT/US2012/046802, mailed Feb. 20, 2013, 9 pages.
International Preliminary Report on Patentability for International Patent Application No. PCT/US2011/056149, mailed Apr. 25, 2013, 6 pages.
International Search Report for International Patent Application No. PCT/US11/52822, mailed Apr. 27, 2012, 5 pages.
International Preliminary Report on Patentability for International (PCT) Patent Application No. PCT/US2011/052822, mailed Apr. 11, 2013 7 pages.
International Search Report for International Patent Application No. PCT/US11/52598, mailed Mar. 27, 2012, 3 pages.
International Preliminary Report on Patentability for International (PCT) Patent Application No. PCT/US2011/052598, mailed Apr. 11, 2013 9 pages.
International Search Report for International Patent Application No. PCT/US11/53835, mailed Apr. 30, 2012, 5 pages.
Written Opinion for International Patent Application No. PCT/US11/53835, mailed Apr. 30, 2012, 4 pages.
International Preliminary Report on Patentability for International (PCT) Patent Application No. PCT/US2011/053835, mailed Apr. 11, 2013 6 pages.
International Preliminary Report on Patentability for International Patent Application No. PCT/US2011/053130, mailed Apr. 11, 2013, 6 pages.
International Preliminary Report on Patentability for International Patent Application No. PCT/US2011/053826, mailed Apr. 11, 2013, 6 pages.
International Preliminary Report on Patentability for International Patent Application No. PCT/US2011/052988, mailed Apr. 11, 2013, 6 pages.
International Preliminary Report on Patentability for International Patent Application No. PCT/US2011/054605, mailed Apr. 11, 2013, 7 pages.
International Preliminary Report on Patentability for International Patent Application No. PCT/US2011/053909, mailed Apr. 11, 2013, 6 pages.
International Preliminary Report on Patentability for International Patent Application No. PCT/US2011/054623, mailed Apr. 11, 2013, 6 pages.
International Preliminary Report on Patentability for International Patent Application No. PCT/US2011/053037, mailed Apr. 11, 2013, 8 pages.
International Preliminary Report on Patentability for International Patent Application No. PCT/US2011/053923, mailed Apr. 11, 2013, 6 pages.
International Preliminary Report on Patentability for International Patent Application No. PCT/US2011/054017, mailed Apr. 11, 2013, 6 pages.
International Search Report for International Patent Application No. PCT/US11/54105, mailed Apr. 30, 2012, 3 pages.
International Preliminary Report on Patentability for International (PCT) Patent Application No. PCT/US2011/054105, mailed Apr. 11, 2013 5 pages.
International Search Report for International Patent Application No. PCT/US11/53585, mailed May 4, 2012, 3 pages.
International Preliminary Report on Patentability for International (PCT) Patent Application No. PCT/US2011/053585, mailed Apr. 11, 2013 6 pages.
International Preliminary Report on Patentability for International Patent Application No. PCT/US2011/053665, mailed Apr. 11, 2013, 6 pages.
International Preliminary Report on Patentability for International Patent Application No. PCT/US2011/053691, mailed Apr. 11, 2013, 6 pages.
International Preliminary Report on Patentability for International Patent Application No. PCT/US2011/054019, mailed Apr. 11, 2013, 6 pages.
International Preliminary Report on Patentability for International Patent Application No. PCT/US2011/053127, mailed Apr. 11, 2013, 6 pages.

(56) References Cited

OTHER PUBLICATIONS

Official Action for U.S. Appl. No. 13/247,719, mailed Mar. 29, 2013 16 pages.
Official Action for U.S. Appl. No. 13/247,719, mailed Aug. 16, 2013 20 pages.
Official Action for U.S. Appl. No. 13/484,951, mailed Aug. 17, 2012, 13 pages.
Official Action for U.S. Appl. No. 13/484,951, mailed Mar. 11, 2013 11 pages.
Official Action for U.S. Appl. No. 13/484,951, mailed Jul. 25, 2013 12 pages.
Official Action for U.S. Appl. No. 13/399,901, mailed Aug. 2, 2013 17 pages.
Official Action for U.S. Appl. No. 12/905,920 mailed Apr. 25, 2013, 16 pages.
Official Action for U.S. Appl. No. 12/948,686, mailed Jul. 26, 2013 11 pages.
Official Action for U.S. Appl. No. 12/948,701, mailed Nov. 16, 2012, 16 pages.
Official Action for U.S. Appl. No. 12/948,701, mailed Jun. 7, 2013 16 pages.
Official Action for U.S. Appl. No. 13/246,665, mailed Apr. 24, 2013 30 pages.
Official Action for U.S. Patent Application No. 246,665, mailed Aug. 28, 2013 33 pages.
Official Action for U.S. Appl. No. 13/217,099 mailed Apr. 10, 2013, 53 pages.
Official Action for U.S. Appl. No. 13/247,885 mailed Mar. 19, 2013, 19 pages.
Notice of Allowance for U.S. Appl. No. 13/247,885, mailed Aug. 29, 2013 12 pages.
Official Action for U.S. Appl. No. 13/247,166 mailed Mar. 21, 2013, 4 pages Restriction Requirement.
Official Action for U.S. Appl. No. 13/247,166, mailed Jul. 2, 2013 12 pages.
Official Action for U.S. Appl. No. 13/217,130 mailed Mar. 15, 2013, 12 pages.
Official Action for U.S. Appl. No. 13/247,170 mailed Apr. 11, 2013, 36 pages.
Official Action for U.S. Appl. No. 13/247,170 mailed Aug. 5, 2013 34 pages.
Official Action for U.S. Appl. No. 13/246,699, mailed Jul. 12, 2013 18 pages.
Notice of Allowance for U.S. Appl. No. 13/246,669, mailed Sep. 11, 2013 16 pages.
Official Action for U.S. Appl. No. 13/246,671, mailed Mar. 27, 2013 34 pages.
Official Action for U.S. Appl. No. 13/246,671, mailed Jul. 15, 2013.
Official Action for U.S. Appl. No. 13/246,128 mailed May 10, 2013, 40 pages.
Official Action for U.S. Appl. No. 13/246,128, mailed Aug. 23, 2013 46 pages.
Official Action for U.S. Appl. No. 13/246,133 mailed Apr. 16, 2013, 25 pages.
Official Action for U.S. Appl. No. 13/246,133 mailed Aug. 23, 2013 32 pages.
Official Action for U.S. Appl. No. 13/246,675 mailed May 1, 2013, 27 pages.
Official Action for U.S. Appl. No. 13/217,121 mailed Mar. 6, 2013, 11 pages.
Official Action for U.S. Appl. No. 13/217,121 mailed Aug. 1, 2013 11 pages.
U.S. Appl. No. 14/068,662, filed Oct. 31, 2013, Benedek.
"Apple iPod and iPhone dock Connector Pinout," AllPinouts, Sep. 27, 2010, 3 pages [www.allpinouts.org/index/php/Apple_iPod,_iPad_and_iPhone_dock].
"How to Install Ubuntu on Your Nexus One/Android!" NexusOneHacks.net, Jul. 6, 2010, 9 pages [nexusonehacks.net/nexus-one-hacks/how-to-install-ubuntu-on-your-android].
Kilpatrick et al., "Securing the X Window System with SELinux," NAI Labs Report No. 03-006, 2003, 33 pages.
Stallman "GNU Operating System: Android and Users' Freedom," Sep. 2, 2013, 4 pages [gnu.org/philosophy/android-and-users-freedom.html].
Official Action for U.S. Appl. No. 13/399,929, mailed Dec. 3, 2013 21 pages.
Official Action for U.S. Appl. No. 12/905,920, mailed Sep. 30, 2013 20 pages.
Final Action for U.S. Appl. No. 13/217,099, mailed Oct. 9, 2013 74 pages.
Official Action for U.S. Appl. No. 13/217,108, mailed Oct. 11, 2013 13 pages.
Final Action for U.S. Appl. No. 13/251,427, mailed Oct. 21, 2013 17 pages.
Notice of Allowance for U.S. Appl. No. 13/247,166, mailed Nov. 4, 2013 14 pages.
Official Action for U.S. Appl. No. 13/217,130, mailed Sep. 16, 2013 12 pages.
Official Action for U.S. Appl. No. 13/246,671, mailed Nov. 20, 2013 50 pages.
Official Action for U.S. Appl. No. 13/246,675, mailed Sep. 27, 2013 32 pages.
Haselton, "Celio Announces Redfly Smart Phone Dock, Software for Windows PCs," Laptop Magazine, Jan. 8, 2009, [retrieved on Feb. 11, 2014], 4 pages. Retrieved from: blog.laptopmag.com/redfly-launches-smartphone-dock-software-for-windows-pcs.
McDermott "Porting Android to a new device," Embedded Software, Jan. 28, 2010, 12 pages [retrieved from: http://yidonghan.wordpress.com/2010/01/28/porting-android-to-a-new-device/].
Rebecka & Zingo, "Share memory using ashmem and binder in the android framework," Android Blog, Mar. 22, 2010, 14 pages. [retrieved from: http://www.androidenea.com/2010/03/share-memory-using-ashmem-and-binder-in.html].
International Preliminary Report on Patentability for International Patent Application No. PCT/US2012/046802, mailed Jan. 23, 2014, 6 pages.
Notice of Allowance for U.S. Appl. No. 13/484,951, mailed May 12, 2014 7 pages.
Official Action for U.S. Appl. No. 13/624,565, mailed Jun. 5, 2014 30 pages.
Official Action for U.S. Appl. No. 13/628,380, mailed Jun. 5, 2014 16 pages.
Official Action for U.S. Appl. No. 13/629,415, mailed Apr. 25, 2014 16 pages.
Official Action for U.S. Appl. No. 13/399,901, mailed May 1, 2014 17 pages.
Notice of Allowance for U.S. Appl. No. 12/905,920, mailed Feb. 27, 2014 13 pages.
Notice of Allowance for U.S. Appl. No. 12/948,686, mailed May 9, 2014 7 pages.
Official Action for U.S. Appl. No. 12/948,701, mailed Jun. 3, 2014 19 pages.
Official Action for U.S. Appl. No. 13/246,665, mailed Feb. 27, 2014 38 pages.
Official Action for U.S. Appl. No. 13/217,099, mailed May 29, 2014 73 pages.
Official Action for U.S. Appl. No. 13/217,108 mailed Feb. 25, 2014, 22 pages.
Official Action for U.S. Appl. No. 13/251,427, mailed May 23, 2014 15 pages.
Official Action for U.S. Appl. No. 13/217,130, mailed Mar. 20, 2014 18 pages.
Official Action for U.S. Appl. No. 13/247,170, mailed Jun. 5, 2014 58 pages.
Notice of Allowance for U.S. Appl. No. 13/246,669, mailed Apr. 11, 2014 11 pages.
Official Action for U.S. Appl. No. 13/246,671, mailed Jun. 5, 2014 60 pages.
Official Action for U.S. Appl. No. 13/246,675, mailed Mar. 7, 2014 34 pages.
International Search Report for International (PCT) Patent Application No. PCT/US2012/046798, mailed Feb. 20, 2013 3 pages.

(56) References Cited

OTHER PUBLICATIONS

International Preliminary Report on Patentability for International (PCT) Patent Application No. PCT/US2012/046798, mailed Jan. 23, 2014 6 pages.
International Preliminary Report on Patentability for International (PCT) Patent Application No. PCT/US2012/046800, mailed Jan. 23, 2014 6 pages.
Extended Search Report for European Patent Application No. 11829766.2, dated Jan. 8, 2014 11 pages.
Official Action for U.S. Appl. No. 13/484,951, mailed Jan. 30, 2014 12 pages.
Final Action for U.S. Appl. No. 13/399,901, mailed Dec. 26, 2013 20 pages.
Official Action for U.S. Appl. No. 12/948,686, mailed Jan. 29, 2014 13 pages.
Notice of Allowance for U.S. Appl. No. 13/247,885, mailed Jan. 9, 2014 8 pages.
Official Action for U.S. Appl. No. 13/250,764, mailed Dec. 11, 2013 23 pages.
Official Action for U.S. Appl. No. 13/247,170, mailed Dec. 11, 2013 47 pages.
Official Action for U.S. Appl. No. 13/246,128, mailed Dec. 26, 2013 43 pages.
Official Action for U.S. Appl. No. 13/246,133, mailed Jan. 15, 2014 37 pages.
Official Action for U.S. Appl. No. 13/217,121, mailed Feb. 10, 2014 12 pages.
European Extended Search Report for European Patent Application No. 11829880.1, mailed Dec. 5, 2014, 10 pages.
Notice of Allowance for U.S. Appl. No. 14/498,330, mailed Oct. 27, 2014 8 pages.
Official Action for U.S. Appl. No. 13/624,565, mailed Oct. 14, 2014 36 pages.
Official Action for U.S. Appl. No. 13/628,170, mailed Nov. 3, 2014 9 pages.
Official Action for U.S. Appl. No. 13/629,415, mailed Dec. 3, 2014 22 pages.
Officl Action for U.S. Appl. No. 13/628,949, mailed Oct. 9, 2014 11 pages.
Official Action for U.S. Appl. No. 13/399,901, mailed Oct. 29, 2014 23 pages.
Official Action for U.S. Appl. No. 13/217,099, mailed Dec. 1, 2014 82 pages.
Official Action for U.S. Appl. No. 13/251,427, mailed Dec. 8, 2014 17 pages.
Notice of Allowance for U.S. Appl. No. 13/250,764, mailed Dec. 4, 2014 8 pages.
Notice of Allowance for U.S. Appl. No. 13/217,130, mailed Dec. 3, 2014 5 pages.
Notice of Allowance for U.S. Appl. No. 13/247,170, mailed Sep. 23, 2014 11 pages.
Notice of Allowance for U.S. Appl. No. 13/246,671, mailed Sep. 25, 2014 9 pages.
Official Action for U.S. Appl. No. 13/246,118, mailed Oct. 8, 2014 10 pages.

* cited by examiner

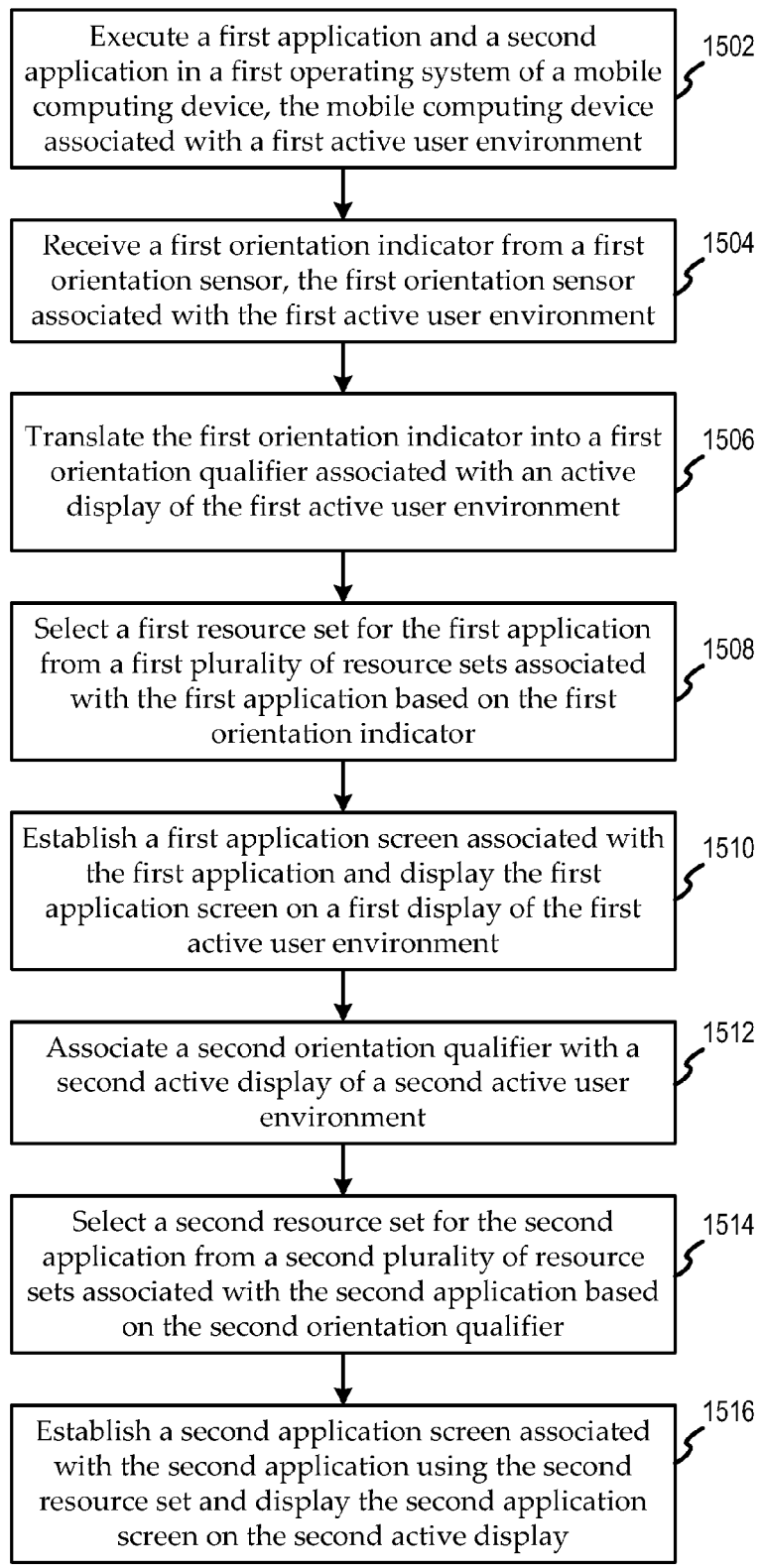

US 8,966,379 B2

DYNAMIC CROSS-ENVIRONMENT APPLICATION CONFIGURATION/ORIENTATION IN AN ACTIVE USER ENVIRONMENT

CROSS-REFERENCE TO RELATED APPLICATIONS

The present application claims the benefits of U.S. Provisional Application Ser. Nos. 61/507,199; 61/507,201, 61/507,203, 61/507,206, and 61/507,209 all of which were filed Jul. 13, 2011 and which are incorporated herein by this reference in its entirety.

BACKGROUND

1. Field

This Application relates generally to the field of mobile computing environments, and more particularly to dynamically configuration applications in a computing environment with multiple active user environments.

2. Relevant Background

Mobile communications devices are becoming ubiquitous in today's society. For example, as of the end of 2008, 90 percent of Americans had a mobile wireless device. Among the fastest growing mobile communications devices are smartphones, that is, mobile phones built on top of a mobile computing platform. Mobile providers have launched hundreds of new smartphones in the last three years based upon several different computing platforms (e.g., Apple iPhone, Android, BlackBerry, Palm, Windows Mobile, and the like). In the U.S., smartphone penetration reached almost 23% by the middle of 2010, and over 35% in some age-groups. In Europe, the smartphone market grew by 41% from 2009 to 2010, with over 60 million smartphone subscribers as of July 2010 in the five largest European countries alone.

Smartphone computing platforms typically include a mobile operating system ("OS") running on a mobile processor. While mobile processors and mobile OSs have increased the capabilities of these devices, smartphones have not tended to replace personal computer ("PC") environments (i.e., Windows, Mac OS X, Linux, and the like) such as desktop or notebook computers at least because of the limited user experience provided. In particular, smartphones typically have different processing resources, user interface device(s), peripheral devices, and applications. For example, mobile processors may have a different processor architecture than PC processors that emphasizes features like low-power operation and communications capabilities over raw processing and/or graphics performance. In addition, smartphones tend to have smaller amounts of other hardware resources such as memory (e.g., SRAM, DRAM, etc.) and storage (e.g., hard disk, SSD, etc.) resources. Other considerations typically include a smaller display size that limits the amount of information that can be presented through a mobile OS graphical user interface ("GUI") and different user input devices. Use interface input device(s) for smartphones typically include a small thumb-style QWERTY keyboard, touch-screen display, click-wheel, and/or scroll-wheel. In contrast, laptop, notebook, and desktop computers that use a desktop OS typically have a full-size keyboard, pointing device(s), and/or a larger screen area. As a result, mobile OSs typically have a different architecture where some capabilities and features such as communications, lower power consumption, touch-screen capability, and the like, are emphasized over traditionally emphasized PC capabilities such as processing speed, graphics processing, and application multitasking Because of the architecture differences, applications or "Apps" designed for mobile OSs tend to be designed for tasks and activities that are typical of a mobile computing experience (e.g., communications, gaming, navigation, and the like). For example, over a third of all Android App downloads have been targeted towards the gaming and entertainment categories while less than 20% of downloads fall under the tools and productivity categories. In addition, many applications that are common on PC platforms are either not available for mobile OSs or are available only with a limited features set.

For example, many smartphones run Google's Android operating system. Android runs only applications that are specifically developed to run within a Java-based virtual machine runtime environment. In addition, while Android is based on a modified Linux kernel, it uses different standard C libraries, system managers, and services than Linux. Accordingly, applications written for Linux do not run on Android without modification or porting. Similarly, Apple's iPhone uses the iOS mobile operating system. Again, while iOS is derived from Mac OS X, applications developed for OS X do not run on iOS. Therefore, while many applications are available for mobile OSs such as Android and iOS, many other common applications for desktop operating systems such as Linux and Mac OS X are either not available on the mobile platforms or have limited functionality. As such, these mobile OSs provide Accordingly, smartphones are typically suited for a limited set of user experiences and provide applications designed primarily for the mobile environment. In particular, smartphones do not provide a suitable desktop user experience, nor do they run most common desktop applications. For some tasks such as typing or editing documents, the user interface components typically found on a smartphones tend to be more difficult to use than a full-size keyboard and large display that may be typically found on a PC platform.

As a result, many users carry and use multiple computing devices including a smartphone, laptop, and/or tablet computer. In this instance, each device has its own CPU, memory, file storage, and operating system. Connectivity and file sharing between smartphones and other computing devices involves linking one device (e.g., smartphone, running a mobile OS) to a second, wholly disparate device (e.g., notebook, desktop, or tablet running a desktop OS), through a wireless or wired connection. Information is shared across devices by synchronizing data between applications running separately on each device. This process, typically called "synching," is cumbersome and generally requires active management by the user.

SUMMARY

To be added after Inventor Review,

BRIEF DESCRIPTION OF THE DRAWINGS

Embodiments of the present invention are illustrated in referenced figures of the drawings, in which like numbers refer to like elements throughout the description of the figures.

FIG. 15 illustrates aspects of concurrent user interface support across multiple OSs using extended rendering contexts, according to various embodiments.

DETAILED DESCRIPTION

The present disclosure is generally directed to dynamically managing configuration of applications for display of application screens across multiple active user environments. More particularly, applications or "Apps" may be running on a first operating system ("OS") of a mobile computing device that generally defines a first active user environment. The first active user environment may include one or more display devices and other user input devices. An application screen of an App running within the first OS may be displayed within a second active user environment connected to the first active user environment. The second active user environment may be associated with the first OS or a second OS also running on the mobile computing device. Further, the application screen may be presented in various ways on the second display of the second active user environment. For example, user interface components of the application screen may be dynamically configured according to a current configuration of the second active user environment to provide the optimal user experience across the multiple user environments and presentation variations. Dynamic configuration includes dynamic selection of application resources based on the current display characteristics including parameters associated with the second active user environment and application screen presentation within the second active user environment. Dynamic configuration may also include dynamically managing application screen orientation across multiple active user environments for various use cases. While the dynamic application configuration techniques presented in the disclosure are discussed with reference to a mobile computing device and various docked terminal environments, the disclosure may, in various embodiments, be applied to other computing devices (e.g., laptop computers, tablet computers, desktop computers, etc.) and is not intended to be limited to handheld mobile computing devices unless otherwise explicitly specified.

Figure 1:
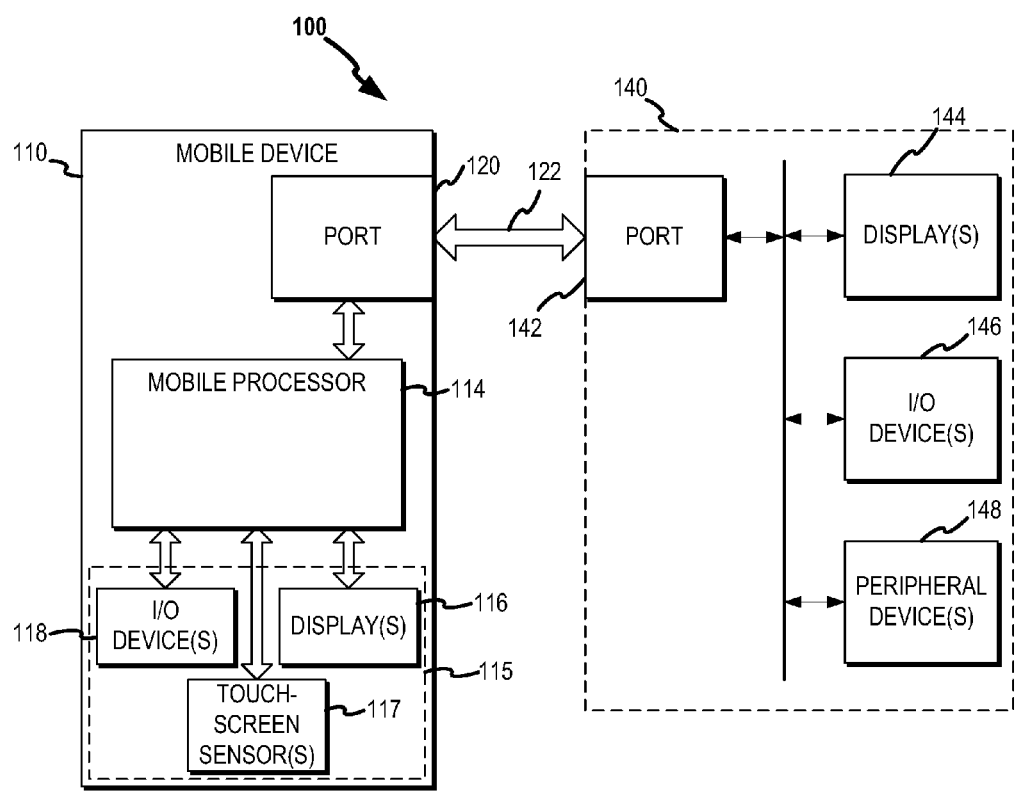
FIG. 1 illustrates a computing environment that provides multiple user computing experiences, according to various embodiments.

FIG. 1 illustrates a computing environment 100 that provides multiple user computing experiences through multiple active user environments, according to various embodiments. A first active user environment 115 of computing environment 100 is defined by display(s) 116, touch screen sensor(s) 117, and/or I/O devices 118 of mobile computing device 110. The display(s) 116 may be operative to display a displayed image or "screen." As used herein, the term display is intended to connote device hardware, whereas screen is intended to connote the displayed image produced on the display. In this regard, a display is physical hardware that is operable to render screen. A screen may encompass a majority of one or more displays. For instance, a screen may occupy substantially all of the display area of one or more displays except for areas dedicated to other functions (e.g. menu bars, status bars, and the like). A screen may be associated with an application and/or an operating system executing on the mobile computing device 110. For instance, application screens or desktop screens may be displayed and an application may have various kinds of application screens that are capable of being manipulated as will be described further below.

When mobile computing device 110 is operated as a standalone mobile device, active user environment 115 presents a typical mobile computing user experience. In this regard, mobile computing device 110 typically includes mobile telephony capabilities and user interaction features suited to a mobile computing use model. For example, mobile computing device 110 may present a graphical user interface ("GUI") suited to active user environment 115 including display(s) 116, touch-screen sensor(s) 117, and/or I/O device(s) 118. The user may interact with Apps running on mobile computing device 110 through an application screen including various interactive features (e.g., buttons, text fields, toggle fields, etc.) presented on display(s) 116. In some instances, the user interacts with these interactive features by way of I/O device(s) 118. In other instances, the user interacts with these features by way of touch-screen sensor(s) 117 using gestures and symbols that are input to touch screen sensor(s) 117 using the user's fingers or a stylus. In yet other instances, the user interacts with these features using a combination of I/O device(s) 118 and touch-screen sensor(s) 117.

Figure 2:
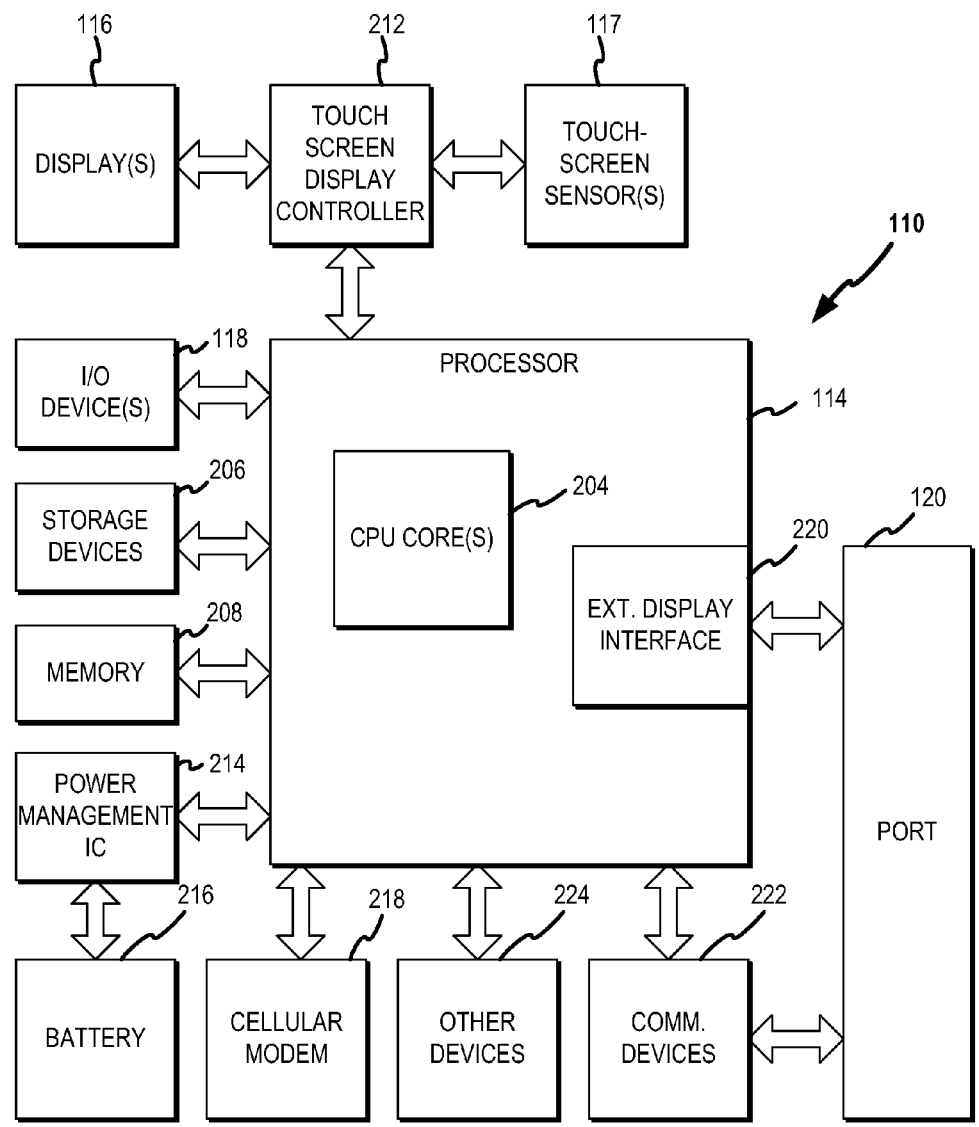
FIG. 2 illustrates an exemplary system architecture for a mobile computing device, according to various embodiments.

FIG. 2 illustrates an exemplary hardware system architecture for mobile computing device 110, according to various embodiments. Mobile computing device 110 includes mobile processor 114 with one or more CPU core(s) 204 and external display interface 220. Generally, mobile computing device 110 may also include memory 206, storage devices 208, touch-screen display controller 212 connected to touch-screen display(s) 116 and/or touch-screen sensor(s) 117, I/O devices 118, power management IC 214 connected to battery 216, cellular modem 218, communication devices 222, and/or other devices 224 that are connected to processor 114 through various communication signals and interfaces. I/O devices 118 generally includes buttons and other user interface components that may be employed in mobile computing device 110. For example, I/O devices 118 may include a set of buttons, (e.g., back, menu, home, search, etc.), off-screen gesture area, click-wheel, scroll-wheel, QWERTY keyboard, etc. Other devices 224 may include, for example, GPS devices, LAN connectivity, microphones, speakers, cameras, accelerometers, gyroscopes, magnetometers, and/or MS/MMC/SD/SDIO card interfaces. External display interface 220 may be any suitable display interface (e.g., VGA, DVI, HDMI, wireless, etc.).

One or more sensor devices of the mobile computing device 110 may be able to monitor the orientation of the mobile computing device with respect to gravity. For example, using an accelerometer, gyroscope, inclinometer, or magnetometer, or some combination of these sensors, mobile computing device 110 may be able to determine whether it is substantially in a portrait orientation (meaning that a long axis of the display(s) 116 is oriented vertically) or substantially in a landscape orientation (long axis oriented horizontally) with respect to gravity. These devices may further provide other control functionality by monitoring the orientation and/or movement of the mobile computing device 110. As used herein, the term orientation sensor is intended to mean some combination of sensors (e.g., accelerometer, gyroscope, inclinometer, magnetometer, etc.) that may be used to determine orientation of a device with respect to gravity and is not intended to be limited to any particular sensor type or technology.

Processor 114 may be an ARM-based mobile processor. In embodiments, mobile processor 114 is a mobile ARM-based processor such as Texas Instruments OMAP3430, Marvell PXA320, Freescale iMX51, or Qualcomm QSD8650/8250. However, mobile processor 114 may be another suitable ARM-based mobile processor or processor based on other processor architectures such as, for example, x86-based processor architectures or other RISC-based processor architectures.

While FIG. 2 illustrates one exemplary hardware implementation 112 for mobile computing device 110, other architectures are contemplated as within the scope of the invention. For example, various components illustrated in FIG. 2 as external to mobile processor 114 may be integrated into mobile processor 114. Optionally, external display interface 220, shown in FIG. 2 as integrated into mobile processor 114, may be external to mobile processor 114. Additionally, other computer architectures employing a system bus, discrete graphics processor, and/or other architectural variations are suitable for employing aspects of the present invention.

Returning to FIG. 1, mobile computing device 110 may be docked with a secondary terminal environment 140. Secondary terminal environment 140 may be some combination of visual rendering devices (e.g., monitor or display) 140, I/O devices (e.g., mouse, touch pad, touch-screen, keyboard, etc.) 146, and other computing peripherals (e.g., HDD, optical disc drive, memory stick, camera, printer, GPS, accelerometer, etc.) 148 connected to mobile computing device 110 by connecting port 142 on secondary terminal environment 140 with port 120 on mobile computing device 110 through interface 122. Interface 122 may be some combination of wired (e.g., USB, Firewire, Thunderbolt, HDMI, VGA, etc.) or wireless (e.g., Bluetooth, WiFi, Wireless HDMI, etc.) interfaces. While secondary terminal environments may have some processing or logic elements such as microcontrollers or other application specific integrated circuits ("ASICs"), they typically do not have a processor that runs a separate instance of an operating system.

Secondary terminal environments that define a second active user environment may be suited for one or more of various use models, depending on the components that make up the secondary terminal environment. Some secondary terminal environments may be associated with a user computing experience that is similar to the user computing experience of the mobile computing device 110, while others may provide a user computing experience more traditionally associated with desktop computing. For example, secondary terminal environment 140 may be a device that includes a display 144 with a corresponding touch-screen sensor 146 that serves as the primary user input for the device. This type of secondary terminal environment may be called a tablet-style secondary terminal environment. While a tablet-style secondary terminal environment may have a larger touch-screen display than mobile computing device 110, the user experience of this type of secondary terminal environment may be similar in some ways to the user experience of mobile computing device 110. Specifically, it may be convenient for a user to interact with applications displayed on this type of secondary terminal environment through similar gesture-based techniques (i.e., touching, swiping, pinching, etc.) and/or virtual keyboards as they might use on mobile computing device 110. In one embodiment known as a "Smart Pad," a tablet-style secondary terminal environment includes a 10.1-inch diagonal (1280×800 resolution) touch-enabled display, standard set of buttons (e.g., back, menu, home, search, etc.), one or more cameras, and an off-screen gesture area. A tablet-style secondary terminal environment may include other peripheral devices that may be used to influence the configuration of applications presented to the user on the tablet-style secondary terminal environment. For example, a tablet-style secondary terminal environment may include a GPS receiver, accelerometer, gyroscope, magnetometer, and/or other sensors for determining its location and/or orientation. Using these sensors, the tablet-style secondary terminal environment may be able to determine whether it is substantially in a portrait orientation or substantially in a landscape orientation.

Another type of secondary terminal environment is a laptop or notebook-style secondary terminal environment. A notebook-style secondary terminal environment generally includes a display screen 144, keyboard and pointing device(s) 146, and/or other peripheral devices 148 in a clamshell type enclosure. In embodiments, a laptop or notebook-style secondary terminal environment may be known as a "Smart Display" or "LapDock." Because this type of secondary terminal environment includes a larger display, full-size keyboard, and pointing device(s), it typically has a user computing experience associated with a desktop computing experience. In this regard, this type of secondary terminal environment may not have a similar user experience profile to mobile computing device 110. A notebook-style secondary terminal environment may include other peripheral devices that may be used to influence the configuration of applications presented to the user on the secondary terminal environment. For example, a notebook-style secondary terminal environment may include a GPS receiver, accelerometer, gyroscope, magnetometer, and/or other sensors for determining its location and/or orientation. Using these sensors, the tablet-style secondary terminal environment may be able to determine whether it is substantially in a portrait orientation or substantially in a landscape orientation.

The various secondary terminal environments may also include a variety of generic input/output device peripherals that make up a typical desktop computing environment. The I/O devices may be connected through a docking hub (or "dock cradle") that includes port 142 and one or more device I/O ports for connecting various commercially available display monitors 144, I/O devices 146, and/or other peripheral devices 148. For example, a docking hub may include a display port (e.g., VGA, DVI, HDMI, Wireless HDMI, etc.), and generic device ports (e.g., USB, Firewire, etc.). As one example, a user may connect a commercially available display, keyboard, and pointing device(s) to the docking hub. In this way, the user may create a secondary terminal environment from a combination of input/output devices. Commonly, this secondary terminal environment will be suited to a desktop computing experience. In particular, this type of secondary terminal environment may be suited to a computing experience designed around the use of a pointing device(s) and physical keyboard to interact with a user interface on the display.

In embodiments, mobile computing device 110 includes multiple operating systems running concurrently on a shared kernel. Concurrent execution of a mobile OS and a desktop OS on a shared kernel is described in more detail in U.S. patent application Ser. No. 13/217,108, filed Aug. 24, 2011, entitled "MULTI-OPERATING SYSTEM," herein incorporated by reference. In this way, a single mobile computing device can provide a mobile computing experience through a first user interaction space and a desktop computing experience through a second user interaction space.

Figure 3:
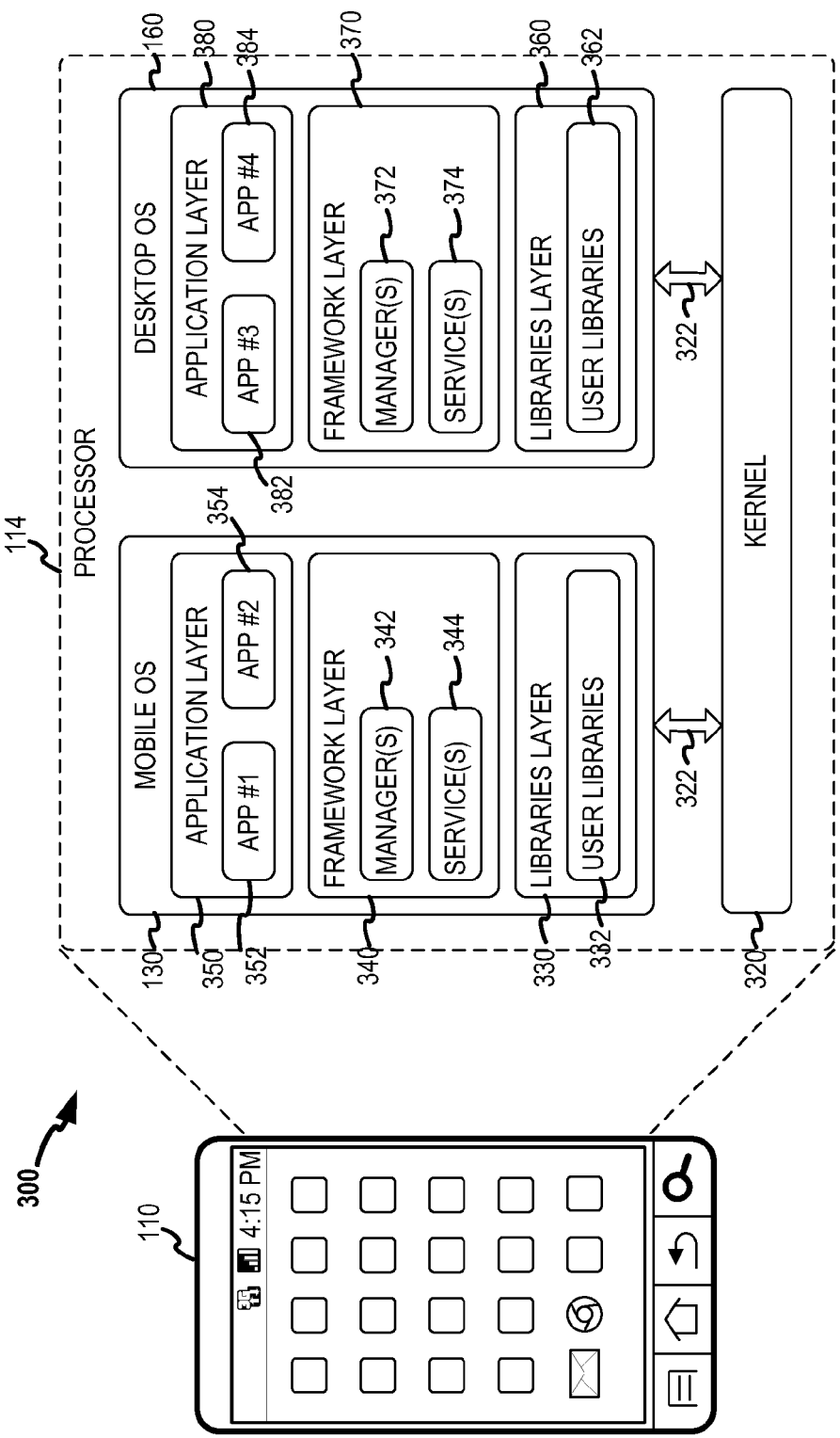
FIG. 3 illustrates an operating system architecture for a computing environment, according to various embodiments.

FIG. 3 illustrates OS architecture 300 that may be employed to run mobile OS 130 and desktop OS 160 concurrently on mobile computing device 110, according to various embodiments. As illustrated in FIG. 3, mobile OS 130 and desktop OS 160 are independent operating systems. Specifically, mobile OS 130 and desktop OS 160 may have independent and incompatible user libraries, graphics systems, and/or framework layers. Functions and instructions for OS architecture 300 may be stored as computer program code on a tangible computer readable medium of mobile computing device 110. For example, instructions for OS architecture 300 may be stored in storage device(s) 208 of mobile computing device 110.

In OS architecture 300, mobile OS 130 and desktop OS 160 run concurrently on shared kernel 320. This means that mobile OS 130 and desktop OS 160 are running on shared kernel 320 at the same time. Specifically, mobile OS 130 and desktop OS 160 both interface to shared kernel 320 through the same kernel interface 322, for example, by making system calls to shared kernel 320. Shared kernel 320 manages task scheduling for processes of both mobile OS 130 and desktop OS 160. In this regard, mobile OS 130 and desktop OS 160 are running independently and concurrently on shared kernel 320. In addition, shared kernel 320 runs directly on mobile processor 114 of mobile computing device 110, as illustrated in FIG. 3. Specifically, shared kernel 320 directly manages the computing resources of processor 114 such as CPU scheduling, memory access, and I/O. In this regard, hardware resources are not virtualized, meaning that mobile OS 130 and desktop OS 160 make system calls through kernel interface 322 without virtualized memory or I/O access.

As illustrated in FIG. 3, mobile OS 130 has libraries layer 330, application framework layer 340, and application layer 350. In mobile OS 130, applications 352 and 354 run in application layer 350 supported by application framework layer 340 of mobile OS 130. Application framework layer 340 includes manager(s) 342 and service(s) 344 that are used by applications running on mobile OS 130. For example, application framework layer 340 may include a window manager, activity manager, package manager, resource manager, telephony manager, gesture controller, and/or other managers and services for the mobile environment. Application framework layer 340 may include a mobile application runtime environment that executes applications developed for mobile OS 130. The mobile application runtime environment may be optimized for mobile computing resources such as lower processing power and/or limited memory space. The mobile application runtime environment may rely on the kernel for process isolation, memory management, and threading support. Libraries layer 330 includes user libraries 332 that implement common functions such as I/O and string manipulation, graphics functions, database capabilities, communication capabilities, and/or other functions and capabilities.

As illustrated in FIG. 3, desktop OS 160 has libraries layer 360, framework layer 370, and application layer 380. In desktop OS 160, applications 382 and 384 run in application layer 380 supported by application framework layer 370 of desktop OS 160. Application framework layer 370 includes manager(s) 372 and service(s) 374 that are used by applications running on desktop OS 160. For example, application framework layer 370 may include a window manager, activity manager, package manager, resource manager, and/or other managers and services common to a desktop environment. Libraries layer 360 may include user libraries 362 that implement common functions such as I/O and string manipulation, graphics functions, database capabilities, communication capabilities, and/or other functions and capabilities.

In various embodiments of the present disclosure, desktop OS 160 runs in a separate execution environment from mobile OS 130. For example, mobile OS 130 may run in a root execution environment and desktop OS 160 may run in a secondary execution environment established under the root execution environment. Processes and applications running on mobile OS 130 access user libraries 332, manager(s) 342 and service(s) 344 in the root execution environment. Processes and applications running on desktop OS 160 access user libraries 362, manager(s) 372 and service(s) 374 in the secondary execution environment.

In embodiments, mobile OS 130 and desktop 160 are independent operating systems with incompatible user libraries, graphics systems, and/or application frameworks. Therefore, applications developed for mobile OS 130 may not run directly on desktop OS 160, and applications developed for desktop OS 160 may not run directly on mobile OS 130. For example, application 352, running in application layer 350 of mobile OS 130, may be incompatible with desktop OS 160, meaning that application 352 could not run on desktop OS 160. Specifically, application 352 may depend on manager(s) 342, service(s) 344, and/or libraries 332 of mobile OS 130 that are either not available or not compatible with manager(s) 372, service(s) 374, and/or libraries 362 of desktop OS 160.

As a result, mobile OS 130 and desktop OS 160 may have different sets of available applications. In this regard, mobile OS 130 and desktop OS 160 of OS architecture 300 provide separate user experiences through separate sets of applications accessible through separate user interaction spaces. The user may access the applications available on (i.e., compiled for and loaded within the execution environment of) mobile OS 130 through a first user interaction space associated with mobile OS 130, and the applications available on desktop OS 160 through a second user interaction space associated with desktop OS 160.

As described above, mobile operating systems typically do not use the same graphics environment as desktop operating systems. Graphics environments for desktop OSs were designed for flexibility and high performance. For example, the X-window system, used by some desktop OSs, provides platform and network independence at the expense of greater processing and system resources. In contrast, graphics environments for mobile OSs are designed more for efficiency and the specific user input devices of a mobile computing environment and less for flexibility. Because the graphics environments of mobile and desktop OSs are often different, an application running on a mobile OS may not be re-directed to display within a user space of a desktop OS by re-directing the graphics information from the graphics server of the mobile OS to the graphics server of the desktop OS.

The most widely adopted mobile OS is Google's Android. While Android is based on Linux, it includes modifications to the kernel and other OS layers for the mobile environment and mobile processors. In particular, while the Linux kernel is designed for a PC (i.e., x86) CPU architecture, the Android kernel is modified for ARM-based mobile processors. Android device drivers are also particularly tailored for devices typically present in a mobile hardware architecture including touch-screens, mobile connectivity (GSM/EDGE, CDMA, Wi-Fi, etc.), battery management, GPS, accelerometers, and camera modules, among other devices. In addition, Android does not have a native X Window System nor does it support the full set of standard GNU libraries, and this makes it difficult to port existing GNU/Linux applications or libraries to Android.

Apple's iOS operating system (run on the iPhone) and Microsoft's Windows Phone 7 are similarly modified for the mobile environment and mobile hardware architecture. For example, while iOS is derived from the Mac OS X desktop OS, common Mac OS X applications do not run natively on iOS. Specifically, iOS applications are developed through a standard developer's kit ("SDK") to run within the "Cocoa Touch" runtime environment of iOS, which provides basic application infrastructure and support for key iOS features such as touch-based input, push notifications, and system services. Therefore, applications written for Mac OS X do not run on iOS without porting. In addition, it may be difficult to port Mac OS X applications to iOS because of differences between user libraries and/or application framework layers of the two OSs, and/or differences in system resources of the mobile and desktop hardware.

Figure 4:
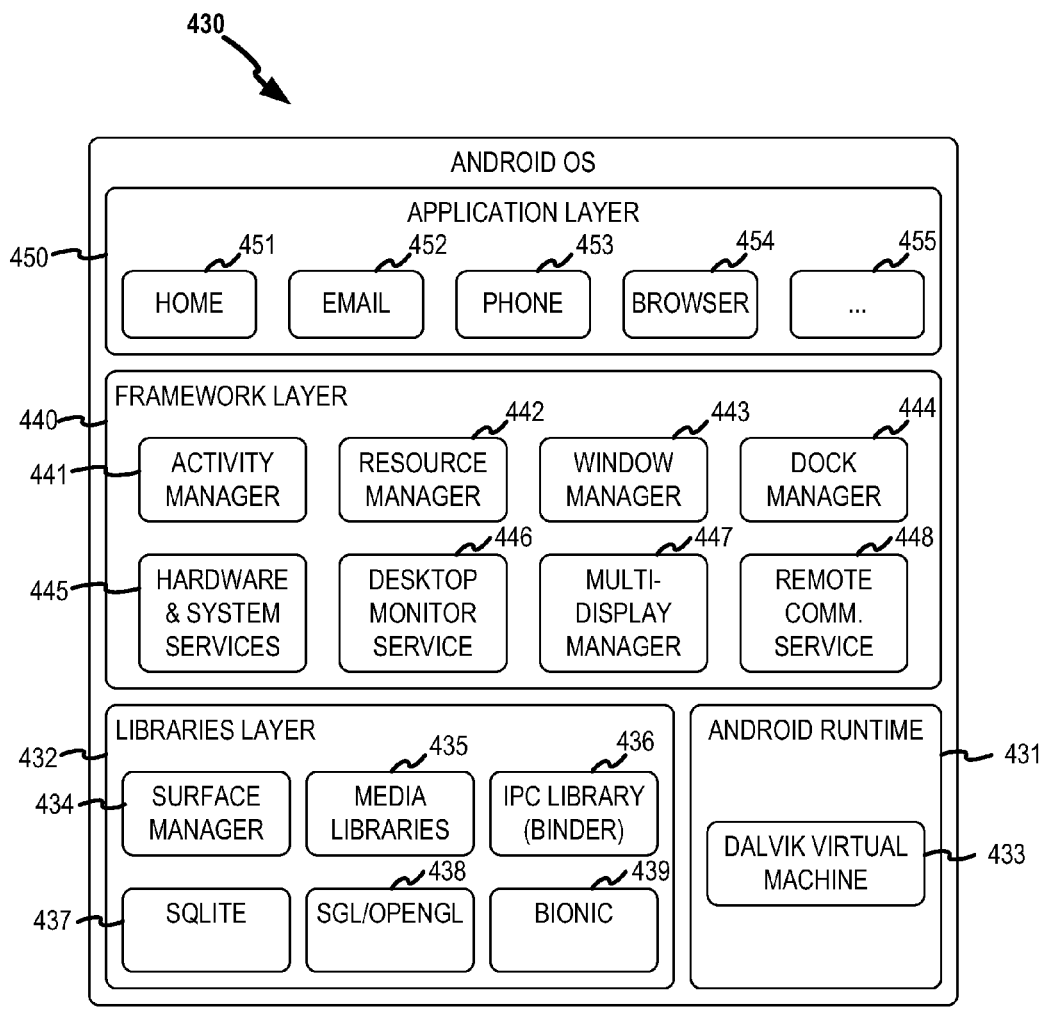
FIG. 4 illustrates an exemplary computing environment employing various aspects of embodiments.
Figure 5:
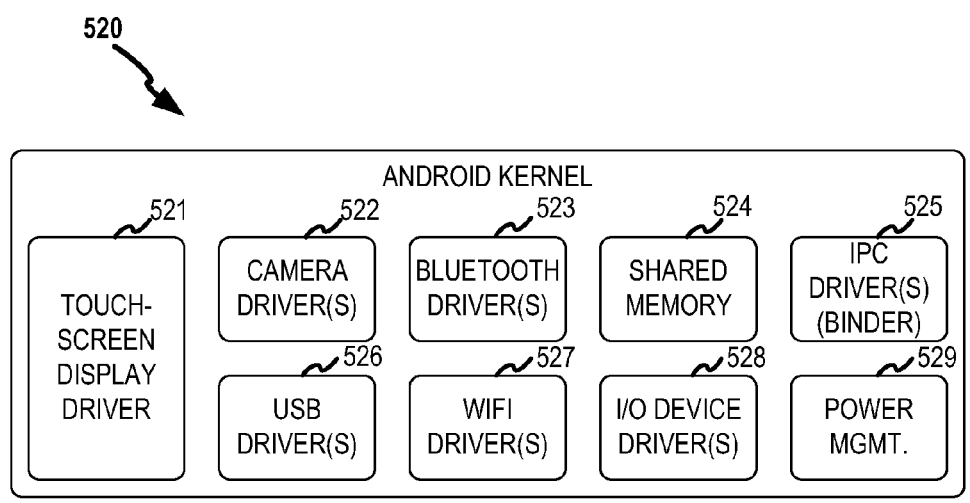
FIG. 5 illustrates aspects of an operating system architecture for a computing environment, according to various embodiments.
Figure 6:
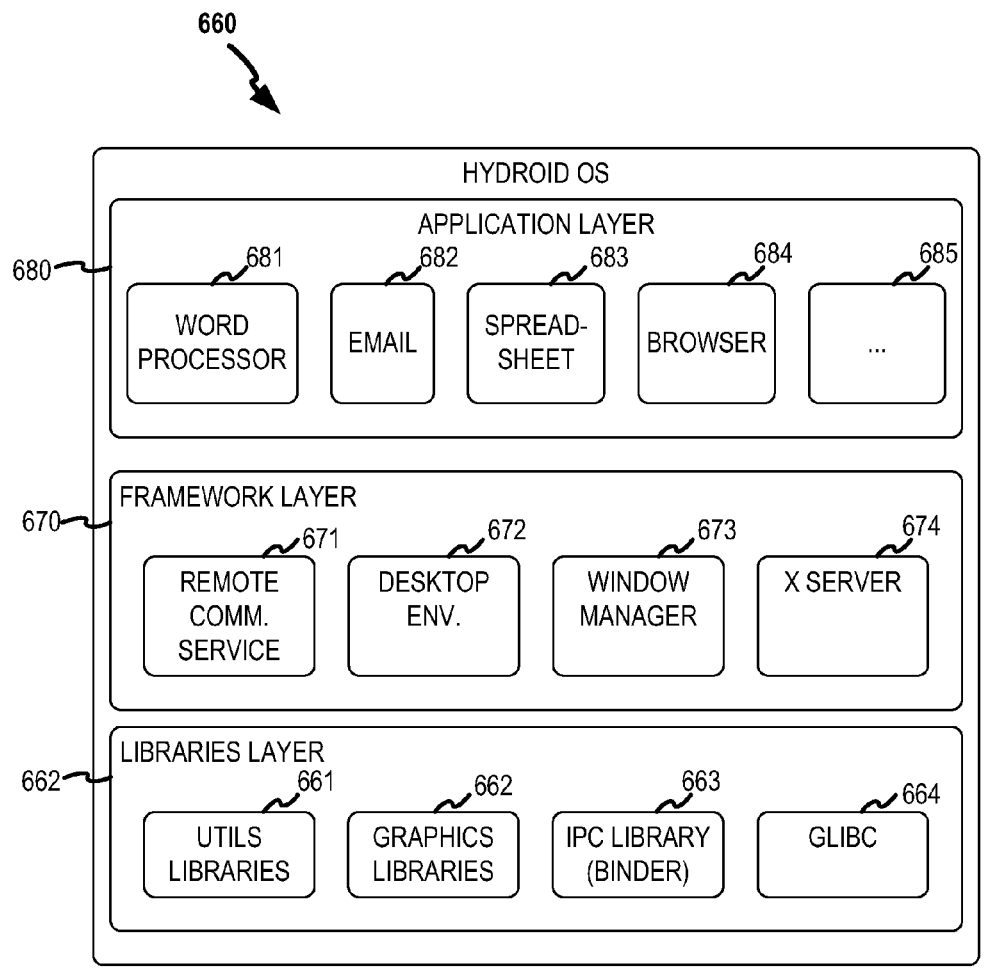
FIG. 6 illustrates an exemplary boot procedure that may be used to configure an operating system architecture of a mobile computing device in more detail, according to various embodiments.

In one embodiment consistent with OS architecture 300, an Android mobile OS and a full Linux OS run independently and concurrently on a modified Android kernel. In this embodiment, the Android OS may be a modified Android distribution while the Linux OS ("Hydroid") may be a modified Debian Linux desktop OS. FIGS. 4-6 illustrate Android mobile OS 430, Android kernel 520, and Hydroid OS 660 that may be employed in OS architecture 300 in more detail, according to various embodiments.

As illustrated in FIG. 4, Android OS 430 includes a set of C/C++ libraries in libraries layer 432 that are accessed through application framework layer 440. Libraries layer 432 includes the "bionic" system C library 439 that was developed specifically for Android to be smaller and faster than the "glibc" Linux C-library. Libraries layer 432 also includes inter-process communication ("IPC") library 436, which includes the base classes for the "Binder" IPC mechanism of the Android OS. Binder was developed specifically for Android to allow communication between processes and services. Other libraries shown in libraries layer 432 in FIG. 4 include media libraries 435 that support recording and playback of media formats, surface manager 434 that manages access to the display subsystem and composites graphic layers from multiple applications, 2D and 3D graphics engines 438, and lightweight relational database engine 437. Other libraries that may be included in libraries layer 432 but are not pictured in FIG. 4 include bitmap and vector font rendering libraries, utilities libraries, browser tools (i.e., WebKit, etc.), and/or secure communication libraries (i.e., SSL, etc.).

Application framework layer 440 of Android OS 430 provides a development platform that allows developers to use components of the device hardware, access location information, run background services, set alarms, add notifications to the status bar, etc. Framework layer 440 also allows applications to publish their capabilities and make use of the published capabilities of other applications. Components of application framework layer 440 of Android mobile OS 430 include activity manager 441, resource manager 442, window manager 443, dock manager 444, hardware and system services 445, desktop monitor service 446, multi-display manager 447, and remote communication service 448. Other components that may be included in framework layer 440 of Android mobile OS 430 include a view system, telephony manager, package manager, location manager, and/or notification manager, among other managers and services.

Applications running on Android OS 430 run within the Dalvik virtual machine 431 in the Android runtime environment 433 on top of the Android object-oriented application framework. Dalvik virtual machine 431 is a register-based virtual machine, and runs a compact executable format that is designed to reduce memory usage and processing requirements. Applications running on Android OS 430 include home screen 451, email application 452, phone application 453, browser application 454, and/or other application(s) ("App(s)") 455. Each application may include one or more application screens through which the user interfaces with the application.

The Android OS graphics system uses a client/server model. A surface manager ("SurfaceFlinger") is the graphics server and applications are the clients. SurfaceFlinger maintains a list of display ID's and keeps track of assigning applications to display ID's. In one embodiment, mobile computing device 110 has multiple touch screen displays 116. In this embodiment, display ID 0 is associated with one of the touch screen displays 116 and display ID 1 is associated with the other touch screen display 116. Display ID 2 is associated with both touch screen displays 116 (i.e., the application is displayed on both displays at the same time).

Graphics information for Android applications and/or activities includes windows, views, and canvasses. Each window, view, and/or canvas is implemented with an underlying surface object. Surface objects are double-buffered (front and back buffers) and synchronized across processes for drawing. SurfaceFlinger maintains all surfaces in a shared memory pool which allows all processes within Android to access and draw into them without expensive copy operations and without using a server-side drawing protocol such as X-Windows. Applications always draw into the back buffer while Surface-Flinger reads from the front buffer. SurfaceFlinger creates each surface object, maintains all surface objects, and also maintains a list of surface objects for each application. When the application finishes drawing in the back buffer, it posts an event to SurfaceFlinger, which swaps the back buffer to the front and queues the task of rendering the surface information to the frame buffer.

SurfaceFlinger monitors all window change events. When one or more window change events occur, SurfaceFlinger renders the surface information to the frame buffer for one or more displays. Rendering includes compositing the surfaces, i.e., composing the final image frame based on dimensions, transparency, z-order, and visibility of the surfaces. Rendering may also include hardware acceleration (e.g., OpenGL 2D and/or 3D interface for graphics processing hardware). SurfaceFlinger loops over all surface objects and renders their front buffers to the frame buffer in their Z order.

FIG. 5 illustrates modified Android kernel 520 in more detail, according to various embodiments. Modified Android kernel 520 includes touch-screen display driver 521, camera driver(s) 522, Bluetooth driver(s) 523, shared memory allocator 524, IPC driver(s) 525, USB driver(s) 526, WiFi driver(s) 527, I/O device driver(s) 528, and/or power management module 530. I/O device driver(s) 528 includes device drivers for external I/O devices, including devices that may be connected to mobile computing device 110 through port 120. Modified Android kernel 520 may include other drivers and functional blocks including a low memory killer, kernel debugger, logging capability, and/or other hardware device drivers.

FIG. 6 illustrates Hydroid OS 660 in more detail, according to various embodiments. Hydroid is a full Linux OS that is capable of running almost any application developed for standard Linux distributions. In particular, libraries layer 662 of Hydroid OS 660 includes Linux libraries that support networking, graphics processing, database management, and other common program functions. For example, user libraries 662 may include the "glibc" Linux C library 664, Linux graphics libraries 662 (e.g., GTK, OpenGL, etc.), Linux utilities libraries 661, Linux database libraries, and/or other Linux user libraries. Applications run on Hydroid within an X-Windows Linux graphical environment using X-Server 674, window manager 673, and/or desktop environment 672. Illustrated applications include word processor 681, email application 682, spreadsheet application 683, browser 684, and other application(s) 685.

The Linux OS graphics system is based on the X-windows (or "X11") graphics system. X-windows is a platform-independent, networked graphics framework. X-windows uses a client/server model where the X-server is the graphics server and applications are the clients. The X-server controls input/output hardware associated with the Linux OS such as displays, touch-screen displays, keyboards, pointing device(s), etc. In this regard, X-windows provides a server-side drawing graphics architecture, i.e., the X-server maintains the content for drawables including windows and pixmaps. X-clients communicate with the X-server by exchanging data packets that describe drawing operations over a communication channel. X-clients access the X communication protocol through a library of standard routines (the "Xlib"). For example, an X-client may send a request to the X-server to draw a rectangle in the client window. The X-server sends input events to the X-clients, for example, keyboard or pointing device input, and/or window movement or resizing. Input events are relative to client windows. For example, if the user clicks when the pointer is within a window, the X-server sends a packet that includes the input event to the X-client associated with the window that includes the action and positioning of the event relative to the window.

Because of the differences in operating system frameworks, graphics systems, and/or libraries, applications written for Android do not generally run on Hydroid OS 660 and applications written for standard Linux distributions do not generally run on Android OS 430. In this regard, applications for Android OS 430 and Hydroid OS 660 are not bytecode compatible, meaning compiled and executable programs for one do not run on the other.

In one embodiment, Hydroid OS 660 includes components of a cross-environment communication framework that facilitates communication with Android OS 430 through shared kernel 520. These components include IPC library 663 that includes the base classes for the Binder IPC mechanism of the Android OS and remote communications service 671.

In one embodiment, Hydroid OS 660 is run within a chrooted (created with the 'chroot' command) secondary execution environment created within the Android root environment. Processes and applications within Hydroid OS 660 are run within the secondary execution environment such that the apparent root directory seen by these processes and applications is the root directory of the secondary execution environment. In this way, Hydroid OS 660 can run programs written for standard Linux distributions without modification because Linux user libraries 662 are available to processes running on Hydroid OS 660 in the chrooted secondary execution environment.

As described above, mobile computing device 110 typically defines a single active user environment through which the user interacts with mobile OS 130 and/or applications running on the mobile OS. Accordingly, mobile OS 130 typically maintains a single active device configuration that includes configuration qualifiers associated with various parameters of the mobile computing device. Device configuration qualifiers may include display properties such as resolution, display pixel density (i.e., dots per inch or "dpi"), display orientation, and/or display aspect ratio. Device configuration qualifiers may also include input device properties such as touch-screen type, navigation method (e.g., touch-screen, trackball, scroll-wheel, etc.), keyboard availability, and the like. Display properties such as display resolution, display orientation, and/or display aspect ratio may correspond to various combinations of device configuration qualifiers. In one embodiment, mobile computing device 110 defines configuration qualifiers for display size (e.g., small, medium, large, xlarge, etc.), display orientation (e.g., portrait, landscape), display pixel density (e.g., low, medium, high, extra-high, etc.), and display aspect ratio (e.g., normal, wide, etc.) that are associated with the display(s) 116 of the mobile computing device.

Because mobile computing devices that run the same mobile OS may have different device configurations, applications for mobile OS 130 may be designed to run on multiple physical device configurations. To that end, applications may externalize application resources to provide compatibility with multiple different computing device hardware configurations without requiring the application to be recompiled. In this regard, application resources may be maintained in separate files and/or locations from application program code. Application resources include images, strings, and/or other components used to create application screens associated with the application. For example, application resources may include graphical resources such as drawable resources (e.g., bitmap files, state lists, shapes, re-sizeable bitmaps, nine-patches, etc.), animation drawables, and/or other drawable or graphical elements used by an application to build an application screen. Other types of resources include animation resources, layout resources, menu resources, and value resources (e.g., strings, integers, colors, etc.). In some instances, mobile OS 130 may be designed to build application screens associated with applications by selecting application screen resources upon startup of the application or modification of an application screen by the application.

Resources may be grouped into sets of resources which may be indexed using a resource configuration list or hierarchy. Each set of resources may provide application resources appropriate for a particular range of device configurations. Generally, when an application is launched, mobile OS 130 selects resources based on the device configuration for an application screen associated with the application. Mobile OS 130 may follow a predetermined procedure for selecting resources based on device configuration qualifiers. For example, mobile OS 130 may traverse a qualifier table to locate an appropriate set of resources for the current device configuration. The qualifier table may define the precedence of configuration qualifiers for selecting an appropriate resource set from the available resource sets for the application.

At the time that a mobile OS is built for a specific mobile computing device, certain device configuration qualifiers may be statically defined for the OS build. These device configuration qualifiers may correspond with physical parameters of the specific mobile computing device. In this regard, these configuration qualifiers are hard-coded into the OS build such that the mobile OS will use these configuration qualifiers to create all application screens for applications run on the mobile OS. Typically, configuration qualifiers such as display resolution, display pixel density, and display aspect ratio may be statically defined in a mobile OS build.

Some qualifiers of a device configuration may change during run-time (i.e., during the life-cycle of the application). Mobile OS 130 may have a mechanism through which it manages device configuration changes during runtime of applications. In particular, mobile OS 130 may tear down an application screen established with a first set of resources for a running application and rebuild the application screen with a second set of resources based on certain configuration changes. Commonly, mobile OS 130 may dynamically rebuild application screens based on an orientation change of the mobile computing device 110.

Referring back to FIG. 1, mobile computing device 110 may be docked with secondary terminal environment 140 by connecting port 120 of mobile computing device 110 to port 142 of secondary terminal environment 140 to create a computing environment 100 that includes multiple active user environments. The multiple active user environments of computing environment 100 may be configured to be used in different ways for various use models. In one configuration, mobile computing device 110 may associate the secondary terminal environment 140 with mobile OS 130. In this configuration, user environment 140 may present a second active user environment to user environment 115, or, user environment 140 may replace user environment 115 as a single active user environment for mobile computing device 110. Accordingly, this configuration may have a single active user environment or more than one active user environment associated with mobile OS 130. This configuration of computing environment 100 may be referred to as a single OS, extended active user environment configuration. Apps running on mobile OS 130 may be displayed in various configurations on the displays 116 associated with the first user environment 115 and one or more display(s) 144 of the second active user environment 140. For instance, an App running on mobile OS 130 could have an application screen displayed on display 144 of the second active user environment 140.

As described above, in some embodiments, mobile computing device 110 has a second operating system (e.g., desktop OS, etc.) in active concurrent execution with the mobile OS on a shared kernel. For these embodiments, mobile computing device 110 may associate secondary terminal environment 140 with desktop OS 160. In this configuration, computing environment 100 presents a first computing experience through a first active user environment 115 associated with mobile OS 130, and, concurrently, a second computing experience through second active user environment 140 associated with desktop OS 160. These configurations may generally be referred to as multiple-OS, multiple active user environment configurations. While generally these configurations provide the advantages of two or more separate user environments suited to different computing experiences, in some instances the user may wish to access various Apps and/or capabilities of one operating system through the active user environment associated with a different operating system. For example, the user may wish to access mobile telephony, location awareness capabilities, and/or other applications and/or services of mobile OS 130 through the active user environment associated with desktop OS 160.

In either the single-OS, extended active user environment configurations or multiple-OS, multiple active user environment configurations described above, applications running on mobile OS 130 may be displayed (i.e., via an application screen) across one or more active user environments. For example, a user may begin interacting with an App running on mobile OS 130 through an application screen displayed within the first user environment 115, subsequently dock the mobile computing device 110 with a secondary user environment 140 and continue to interact with the same App through an application screen displayed on a display of the secondary user environment 140. Alternatively, a user may launch an App on mobile OS 130 from within a secondary user environment 140 such that an application screen associated with the App is displayed within the secondary user environment 140.

An application screen displayed across environments (i.e., an application running on an OS associated with a first active user environment displayed on a display associated with a second active user environment) may be displayed in a number of configurations within the second active user environment. In some instances, the application screen may take up all or substantially all of a display associated with the second active user environment. In other instances, the application screen may be displayed within a window on a display associated with the second active user environment. In these instances, the window may be reconfigured dynamically by the user according to current user preferences related to interacting with the App. The second active user environment 140 may be associated with the mobile OS 130, or, in some instances, the second active user environment 140 may be associated with the desktop OS 160.

Embodiments provide various novel techniques for dynamically configuring application screens for various device configurations that include extended user environments and/or multiple user environments. Dynamic configuration of application screens includes dynamically maintaining multiple active device configurations (i.e., multiple sets of configuration qualifiers associated with separate active user environments) and dynamic resource selection based on the multiple active device configurations. Dynamic configuration of application screens takes into account characteristics of the multiple active user environments. Embodiments also support dynamic configuration of applications displayed across user environments in a multiple operating system computing environment. These embodiments support dynamic configuration of applications running in a first operating system and displayed within console windows of a second operating system on a per console window and/or per application basis. For example, these embodiments include determining and maintaining an active device configuration in a first OS associated with a console window of a second OS used to display an application running in the first OS through cross-environment display techniques. Application screens of applications running in the first OS are generated using dynamic resource selection based on configuration qualifiers of the active device configuration associated with the console window of the second OS.

In embodiments, configuration qualifiers associated with a virtual display may be translated from indicators and/or parameters coming from multiple sources. That is, some configuration qualifiers may be determined from parameters associated with the first user environment 115, while other configuration qualifiers (e.g., orientation qualifier) may be determined from parameters associated with a secondary terminal environment. In yet other embodiments, a single configuration qualifier may be translated from multiple display and/or device parameters, where some display and/or device parameters are associated with the first active user environment 115 and some display and/or device parameters are associated with the secondary terminal environment.

Yet other embodiments manage screen orientation for an App based on various characteristics of a second active user environment and relationships between the mobile computing device and the second active user environment. For example, the mobile computing device may have a fixed mechanical relationship to a secondary terminal environment that determines an orientation relationship or offset. In instances where the mobile computing device does not have a fixed mechanical relationship to the secondary terminal environment, the secondary terminal environment may or may not have an independent orientation sensor for determining the orientation of the secondary terminal environment independently of the mobile computing device. Embodiments may also use orientation and/or aspect ratio of an application screen within a second active user environment for application configuration, including dynamically selecting resources for the application screen. In yet other embodiments, the active device configuration for an application screen may be disassociated from the orientation sensor of the mobile device. In these embodiments, the orientation qualifier of the active device configuration may be determined according to device characteristics of the second active user environment, a default orientation, and/or a user-selectable orientation.

Figure 7:
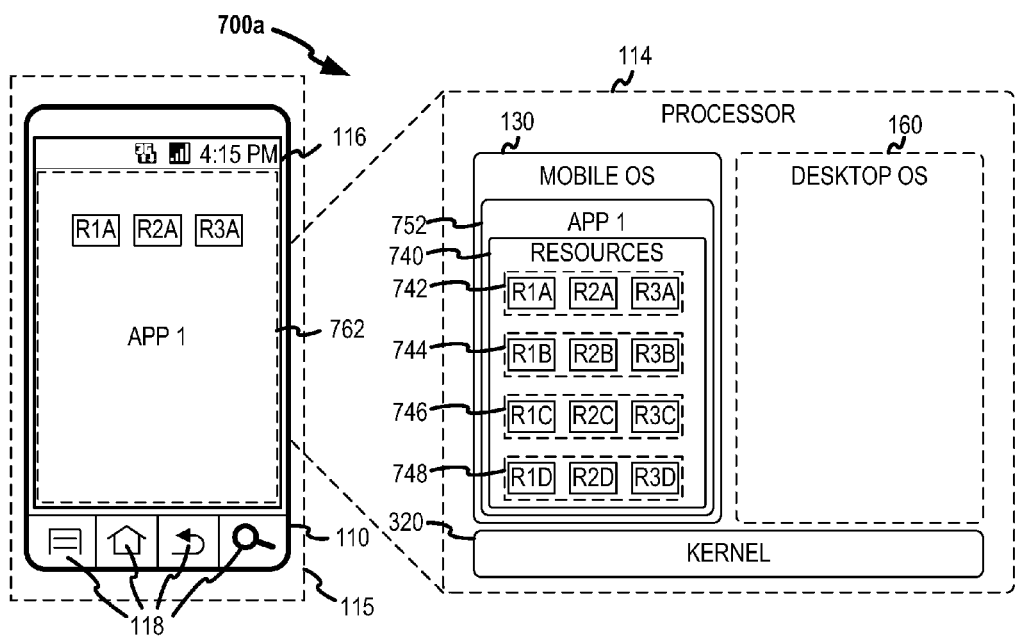
FIG. 7 illustrates an operating system architecture configuration for providing cross-environment rendering of applications and/or user interaction spaces, according to various embodiments.

FIG. 7 illustrates a computing environment 700*a* that includes mobile computing device 110. As described above, mobile computing device 110 generally includes one or more display device(s) 116 and one or more input device(s) (e.g., touch screen sensor(s) 117 and/or I/O device(s) 118, etc.) that make up a first user environment 115. Mobile computing device 110 includes a first operating system (e.g., mobile OS 130, etc.). Mobile computing device 110 may have a second operating system (e.g., desktop OS 160, etc.) running concurrently with the first OS on a shared kernel. When mobile computing device 110 is not docked with a secondary terminal environment, the first operating system provides a mobile computing experience through the first active user environment. When mobile computing device 110 is not docked, the second OS, if present, may be in a suspended state.

In computing environment 700*a*, application 752 runs on mobile OS 130. Application 752 includes multiple resource sets including resource set A 742, resource set B 744, resource set C 746, and/or resource set D 748. Resource sets A, B, C, and D may include corresponding resources that may be used to build applications screens that are appropriate for various device configurations. As illustrated in FIG. 7, application screen 762 is displayed on display(s) 116 of mobile computing device 110 using resource set A 742. Resource set A 742 may have a target device configuration range that includes a display having display properties similar or substantially similar to display device(s) 116 of mobile computing device 110. In this regard, resource set A may include drawable resources and layout resources that define a particular application screen appearance that is suited to a display having display properties (e.g., height, width, dpi, etc.) within a range that includes display(s) 116.

Single-OS, Extended Active User Environment Embodiments

Figure 8:
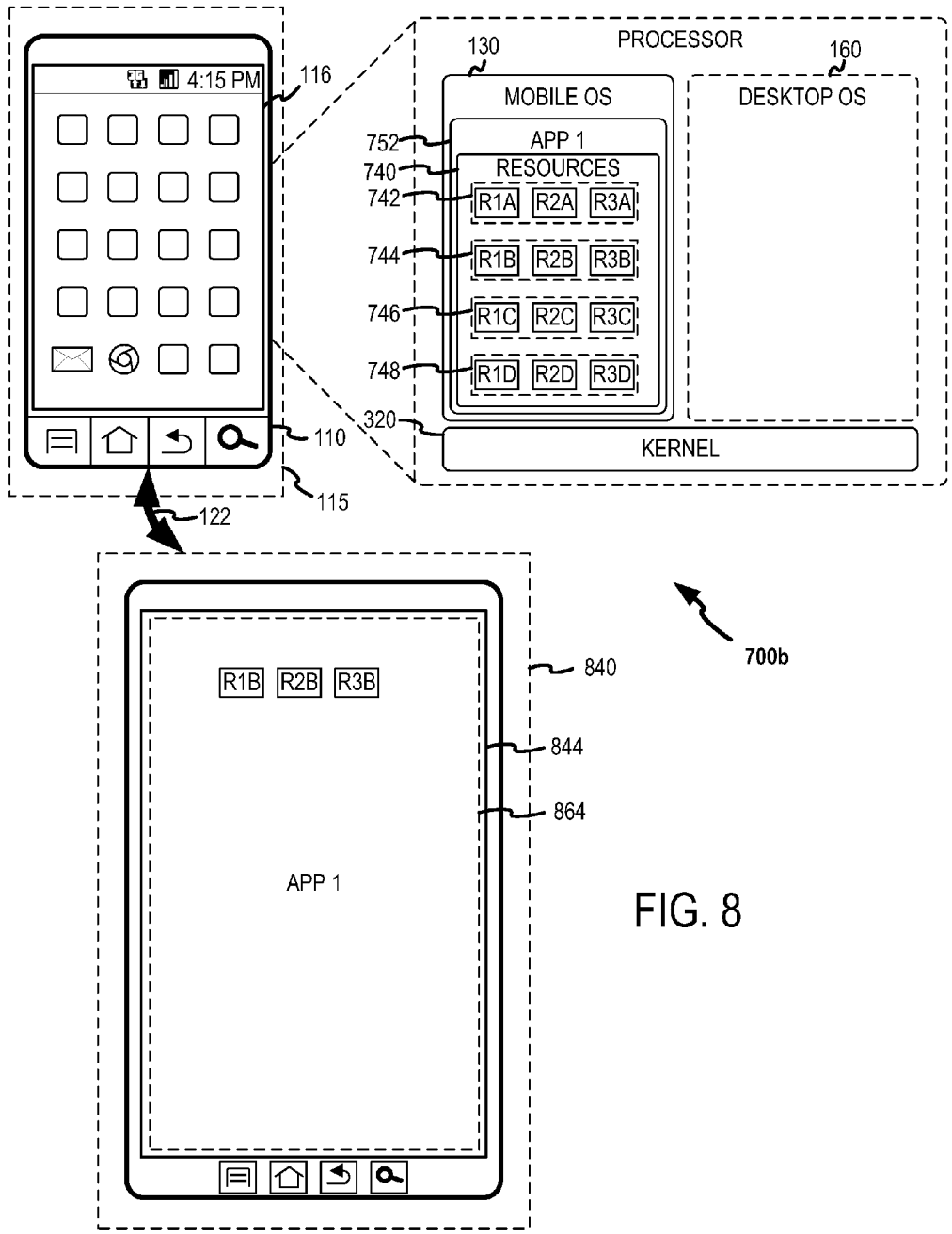
FIG. 8 illustrates a computing environment with multiple user environments, according to various embodiments.

FIG. 8 illustrates a computing environment 700*b* in which mobile computing device 110 has been docked or connected with a tablet-style secondary terminal environment 840 through interface 122. When mobile computing device 110 is docked with secondary terminal environment 840, computing environment 700*b* includes a first user environment 115 and a second user environment 840. Upon docking or connecting a secondary terminal environment, mobile computing device 110 may determine a user experience profile associated with the secondary terminal environment. In the computing environment 700*b*, the mobile computing device 110 may determine that secondary terminal environment has a user experience profile associated with a tablet-style secondary terminal environment. In this instance, mobile computing device 110 may associate tablet-style secondary terminal environment 840 with mobile OS 130, according to a user or device setting. In various embodiments, a second OS (e.g., desktop OS 160) may be running concurrently with mobile OS 130 on shared kernel 320. In these instances, the second OS may be in a suspended state when mobile computing device 110 is undocked. If mobile computing device 110 associates a docked tablet-style secondary terminal environment 840 with mobile OS 130, the second OS may remain suspended.

Tablet-style secondary terminal environment 840 may have a physical dock connector to which mobile computing device 110 may be attached. The physical dock connector may provide electrical coupling (e.g., interface 122, etc.) and optionally mechanical fixturing of the mobile computing device 110 to the tablet-style secondary terminal environment 840. That is, the dock connector may establish a predetermined physical relationship between display 116 of the first user environment 115 and display 844 of secondary terminal environment 840. The predetermined physical relationship may define a fixed orientation offset. For example, when display 116 is in a portrait orientation display 844 may also be in a portrait orientation (i.e., the fixed offset may be zero degrees), or when display 116 is in a portrait orientation, display 844 may be in a landscape orientation (i.e., a fixed offset of 90 degrees).

Alternatively, tablet-style secondary terminal environment 840 may be connected to mobile computing device 110 through a wired or wireless interface that does not constrain the physical relationship between mobile computing device 110 and tablet-style secondary terminal environment 840. For example, tablet-style secondary terminal environment 840 may be connected to mobile computing device 110 through a wireless-HDMI interface. In this instance, relative positioning of tablet-style secondary terminal environment 840 to mobile computing device 110, including orientation with respect to gravity, may be arbitrary. In some embodiments, tablet-style secondary terminal environment 840 includes an orientation sensor. In these instances, tablet-style secondary terminal environment 804 may indicate an orientation of display 844 with respect to gravity to mobile computing device 110 through interface 122.

Mobile computing device 110 may query tablet-style secondary terminal environment 840 to determine various parameters associated with the docked secondary terminal environment 840. For example, mobile computing device may query terminal environment 840 for parameters such as display dimensions (e.g., width, height, etc.), display pixel density (e.g., dpi, etc.), display orientation (e.g., arbitrary, offset, on-board sensing, etc.). Mobile computing device 110 may receive these parameters through interface 122. For example, interface 122 may include an extended display identification data (EDID) interface that provides a data structure indicating the display properties and/or I/O device capabilities of the secondary terminal environment 840. Various user interface properties for the second user environment 840 may be different than for the first user environment 115. In particular, display properties for display 844 of the second user environment 840 may be different than display properties of one or more display(s) 116 of the first user environment 115. For example, display 844 may have a larger screen area (i.e., larger physical display dimensions), higher display resolution, different display aspect ratio, different display pixel density, and/or other differences from display(s) 116.

Consider that mobile computing device 110 determines that a user experience profile of secondary terminal environment 840 corresponds to a tablet-style secondary terminal environment, and that a device setting or user setting of mobile computing device 110 indicates that this type of secondary terminal environment is to be associated with mobile OS 130. Mobile OS 130 establishes a virtual display (i.e., generates a virtual display ID and corresponding graphics context for building graphics information from application screen content and/or surface data) associated with display 844 of the tablet-style secondary terminal environment 840. In some instances, mobile computing device 110 may maintain operation of user environment 115 when mobile computing device 110 is docked to a tablet-style secondary terminal environment 840. In this instance, display 844 of secondary terminal environment 840 acts as an alternative display to display 116 through which the user interfaces with mobile OS 130. In other instances, mobile computing device 110 may disable user environment 115 when mobile computing device 110 is docked to secondary terminal environment 840. In this instance, secondary terminal environment 840 replaces user environment 115 as the single active user environment.

Once mobile computing device 110 and secondary terminal environment 840 are connected through interface 122 and mobile OS 130 is associated with secondary terminal environment 840, the user may display one or more active application screens on the second active user environment. For example, the user may have indicated through a gesture or menu selection that application 752 is to be displayed in secondary terminal environment 840. Upon detection of an event indicating that the application screen associated with application 752 is to be displayed on display 844 of tablet-style secondary terminal environment 840, mobile OS 130 builds application screen 864 on display 844 using resources that are appropriate for application screen 864.

Dynamically selecting resources for application screen 864 includes determining properties associated with the display and I/O devices associated with tablet-style secondary terminal environment 840, selecting qualifiers that define the graphics context of the virtual display associated with tablet-style secondary terminal environment 840, and selecting qualifiers that determine I/O properties of tablet-style secondary terminal environment 840. That is, mobile OS 130 maintains a separate active device configuration associated with secondary terminal environment 840 (e.g., via the virtual display ID associated with secondary terminal environment 840). Configuration qualifiers associated with the secondary terminal environment may be determined in part from device parameters of the mobile computing device (e.g., dock mode, etc) and in part from device parameters of the secondary terminal environment (e.g., aspect ratio, dpi, display size, etc.). Determining configuration properties of tablet-style secondary terminal environment 840 includes determining an orientation configuration of tablet-style secondary terminal environment 840. Several configuration qualifiers associated with the secondary terminal environment 840 may be dynamically updated as the tablet-style secondary terminal environment 840 is interacted with by the user.

In various embodiments described above, tablet-style secondary terminal environment 840 has a fixed orientation offset to mobile computing device 110. For example, mobile computing device 110 may physically dock with tablet-style secondary terminal environment 840 such that the docking arrangement defines a fixed orientation relationship between display 116 and display 844. In this instance, mobile OS 130 establishes a graphics context for the virtual display associated with tablet-style secondary terminal environment 840 according to the orientation of the mobile computing device 110 and the fixed orientation offset. For example, mobile computing device 110 may dock with a tablet-style secondary terminal environment 840 such that a long axis of one or more of the display(s) 116 of mobile computing device is orthogonal to the long axis of a display 844 of the tablet-style secondary terminal environment 840. Alternatively, mobile computing device 110 may dock with tablet-style secondary terminal environment 840 such that display(s) 116 of mobile computing device and display 844 have a different orientation offset. In these fixed offset embodiments, mobile computing device 110 generates qualifiers for resource selection for application 752 based on an orientation of the mobile computing device 110 and the fixed offset. For example, if mobile computing device 110 has a portrait orientation, mobile OS 130 may define an orientation qualifier for the virtual display associated with display 844 as having a landscape orientation.

In other embodiments described above, mobile computing device 110 and tablet-style secondary terminal environment 840 may be connected such that they do not have a constrained physical relationship. For example, mobile computing device 110 and tablet-style secondary terminal environment 840 may be connected through a wired or wireless interface. In these embodiments, tablet-style secondary terminal environment 840 may have an on-board orientation sensor to determine the orientation of display 844 with respect to gravity. In these instances, mobile OS 130 associates an orientation qualifier of the virtual display with the orientation of tablet-style secondary terminal environment 840 through an orientation indicator received from the tablet-style secondary terminal environment 840. Accordingly, the secondary terminal environment orientation qualifier is used to determine dynamic resource selection for application screen 864. For example, tablet-style secondary terminal environment 840 may indicate that display 844 is in a portrait orientation. As illustrated in FIG. 8, application screen 864 may be built using resource set B 744. As described above, resource set B 744 may be appropriate for the display properties of display 844 and the current orientation of tablet-style secondary terminal environment 840. In these instances, mobile OS 130 may maintain the mobile computing device orientation qualifier associated with display of application screens on display 116 of the mobile computing device 110. In this regard, mobile OS 130 maintains multiple orientation qualifier feeds associated with multiple active user environments. Mobile OS 130 may associate orientation qualifiers with particular display IDs such that application screens displayed through the particular displays update according the orientation of the associated displays.

Figure 9:
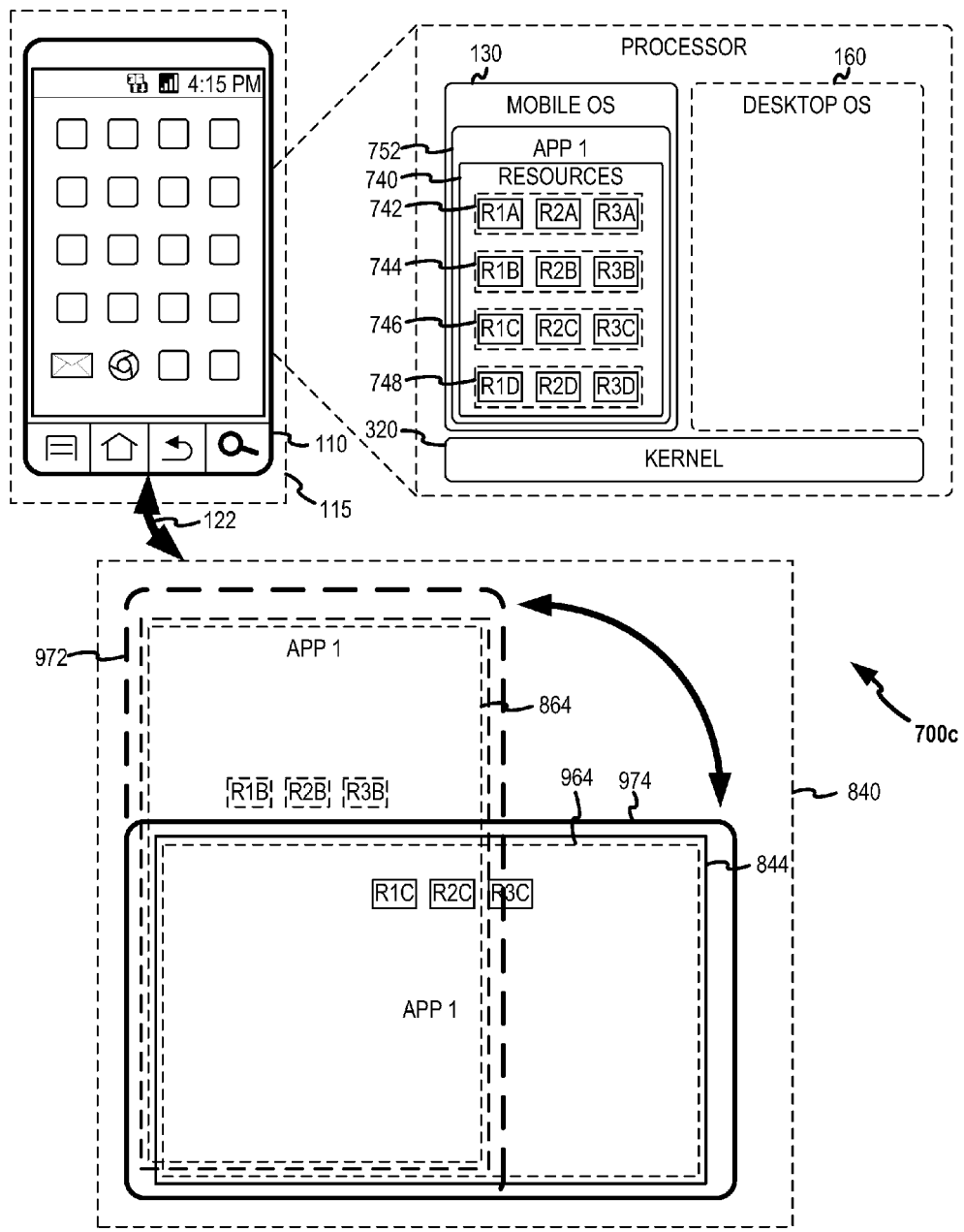
FIG. 9 illustrates aspects of cross-environment remote rendering, according to various embodiments.

Consider that the user continues to interact with application 752 through application screen 864 on display 844 of tablet-style secondary terminal environment 840 in the portrait orientation as illustrated in FIG. 8. For particular user interactions with application 752, the user may desire that application 752 present a landscape orientation. FIG. 9 illustrates a computing environment 700c in which the tablet-style secondary terminal environment 840 is operated by the user in a first position 972 generally providing a portrait orientation for display 844. In the first position 972, application screen 864 of application 752 has been established using resource set B 744. At some point during interaction with application 752 through application screen 864, the user rotates the tablet-style secondary terminal environment 840 from a first position 972 having generally a portrait orientation to a second position 974 having generally a landscape orientation.

In fixed orientation offset embodiments, mobile OS 130 updates the orientation qualifier associated with the tablet-style secondary terminal environment based on the change in orientation of mobile computing device 110 and the fixed orientation offset. For example, consider that the fixed orientation offset between mobile computing device 110 and tablet-style secondary terminal environment 840 is 90 degrees. In this instance, when the user rotates the tablet-style secondary terminal environment 840 from the first position 972 to the second position 974, mobile computing device 110 will indicate that it has been rotated from a landscape to a portrait orientation. In this instance, mobile OS 130 applies the orientation offset and determines that tablet-style secondary terminal environment 840 has been rotated from a portrait orientation to a landscape orientation. Mobile OS 130 tears down the application screen 864 and performs dynamic resource selection to select the appropriate resources for the new orientation. For example, the application screen 964 may be built with resource set C 746 as illustrated in FIG. 9.

In multiple orientation feed embodiments, when tablet-style secondary terminal environment 840 is rotated to the second position 974, mobile OS 130 may receive an indicator message from the tablet-style secondary terminal environment 840 indicating that the orientation of display 844 has changed. Mobile OS 130 updates the orientation qualifier associated with display 844 to the new orientation of the second position 974. Again, as illustrated in FIG. 9, mobile OS 130 tears down application screen 864 and establishes application screen 964 on display 844 using resource set C 746 of application 752.

In other embodiments, tablet-style secondary terminal environment 840 may not include an independent orientation sensor. In these embodiments, mobile OS 130 may disassociate resource selection for applications displayed on the second user environment with the orientation qualifier associated with mobile computing device 110. In these instances, mobile OS 130 may determine the orientation qualifier associated with the second active user environment based on device properties such as a standard use-mode orientation. Alternatively, a default orientation setting, user setting, or resource preference parameter may determine the orientation qualifier associated with display 844 of tablet-style secondary terminal environment 840. For example, a certain application may default to a resource set associated with a portrait orientation of display 844 for an application screen displayed on display 844.

Multiple-OS, Multiple User-Environment Embodiments

Returning to FIG. 7, the first OS (e.g., mobile OS 130, etc.) may be running concurrently with a second OS (e.g., desktop OS 160, etc.) on shared kernel 320. In computing environment 700a, mobile OS 130 is associated with the first active user environment 115 defined by the mobile computing device 110. When the mobile computing device 110 is in an undocked state (i.e., not connected or docked to a secondary terminal environment), desktop OS 160 may be in a suspended state.

Figure 10:
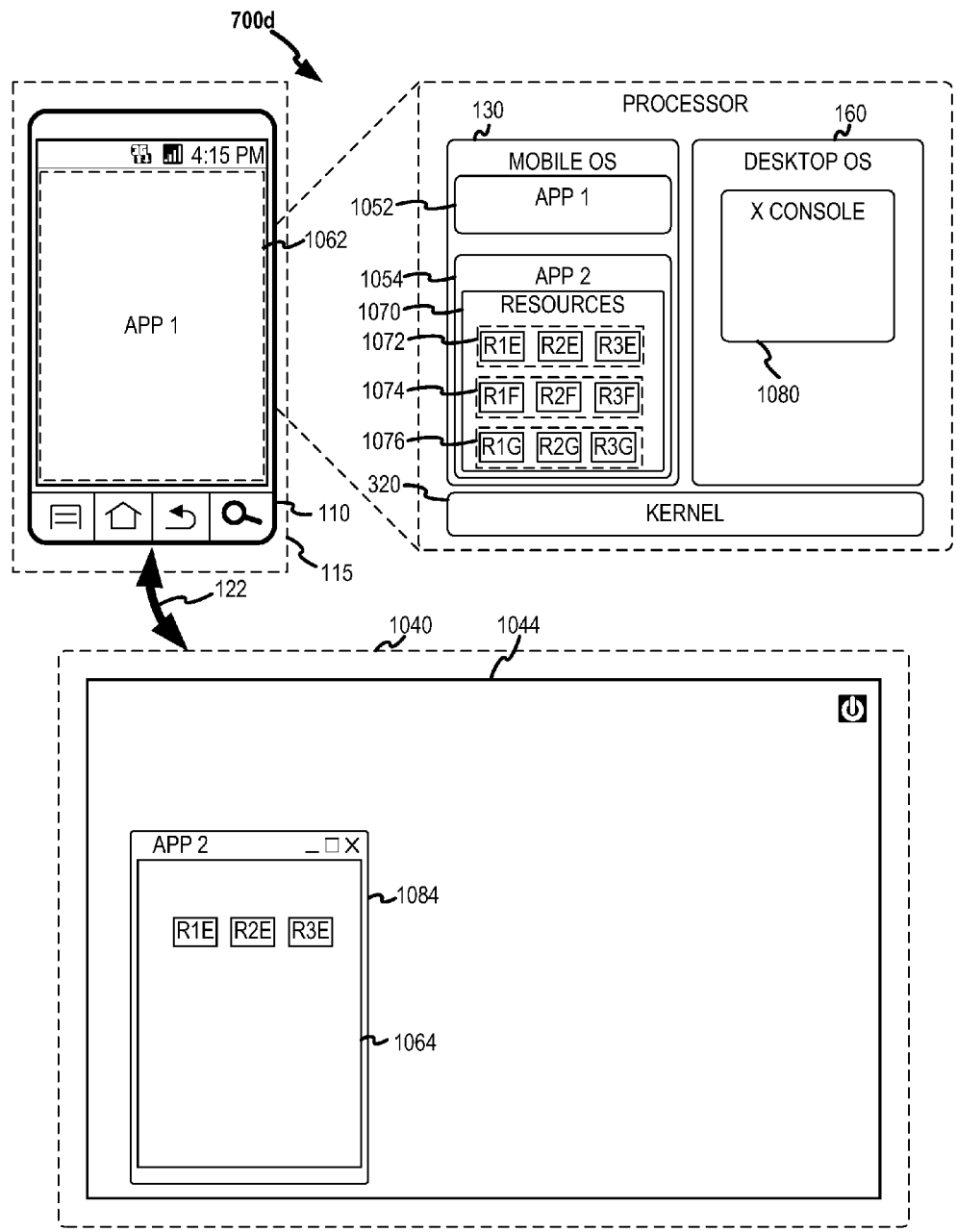
FIG. 10 shows a flow diagram of an illustrative method for cross-environment remote rendering in a non-extended rendering context, according to various embodiments.

FIG. 10 illustrates a computing environment 700d where mobile computing device 110 is docked to a secondary terminal environment 1040. Secondary terminal environment 1040 may be a notebook-type secondary terminal environment, a desktop-type secondary terminal environment, and/or another type of secondary terminal environment. In computing environment 700d, mobile computing device 110 may associate desktop OS 160 with secondary terminal environment 1040. In this instance, desktop OS 160 presents an independent desktop computing experience through the second user environment defined by the I/O devices associated with secondary terminal environment 1040 (e.g., display 1044, a keyboard, pointing device(s), etc.).

Using various techniques, applications running on mobile OS 130 may be accessed and have application screens displayed within a console window of secondary user environment 1040 associated with desktop OS 160. These techniques are described in more detail in U.S. patent application Ser. No. 13/246,665, filed Sep. 27, 2011, entitled "INSTANT REMOTE RENDERING," the entire contents of which are incorporated herein for all purposes.

Dynamically configuring applications displayed across user environments associated with different operating systems raises a number of issues. For example, mobile OS's typically display one application screen at a time and maintain a single active device configuration associated with the mobile computing device. Accordingly, application screens for mobile OS's are not designed to be dynamically resized. However, a cross-environment application screen may be displayed within a window of a GUI of a separate OS (e.g., desktop OS 160, etc.). Further, a desktop OS may display multiple application screens concurrently within windows of the desktop OS GUI. These windows may be dynamically stretched or otherwise resized in various ways. Additionally, other device configuration parameters associated with a secondary terminal environment may affect how a cross-environment application screen appears and is interacted with by the user. For example, input devices associated with secondary terminal environments may determine the way that the user interacts with application screens. A secondary terminal environment may also include other attributes that can dynamically affect device configuration. For example, the secondary terminal environment may have an orientation sensor that can sense the orientation of a display of the secondary terminal environment with respect to gravity. In these instances, the orientation of the cross-environment application screen may be affected by the orientation of the secondary terminal environment.

Accordingly, dynamically configuring cross-environment application screens includes maintaining multiple active device configurations based on device configuration parameters that come from a variety of sources. These sources include devices associated with the secondary terminal environment 1040 (e.g., EDID data from display 1044, availability and/or type of input devices, sensor information, etc.), console windows displayed on the display of the second user environment, and/or information from sensors on mobile computing device 110 (e.g., ambient light level, etc.). Mobile OS 130 determines the appropriate configuration qualifier for each active device configuration and selects resources for applications based on the active device configuration associated with the application (e.g., through a display identifier, etc.).

Consider that computing environment 700d represents mobile computing device 110 docked with a notebook-style secondary terminal environment 1040. A first application 1052 runs on mobile OS 130 and is associated with application screen 1062 displayed on display 116 of mobile computing device 110. A second application 1054 is also running on mobile OS 130. Application 1054 is associated with application screen 1064 displayed on display 1044 of secondary terminal environment 1040. For example, application screen 1064 may be displayed through a console window 1084 associated with a console application 1080 running on desktop OS 160. In embodiments, mobile OS 130 may define a virtual display associated with console application 1080. That is, to mobile OS 130, console application 1080 may be considered an independent display device through which mobile OS 130 may display applications screens and/or other graphics information in console window 1084.

In computing environment 700d, mobile OS 130 maintains multiple active device configurations. For example, mobile OS 130 may maintain an active device configuration for the first user environment 115 and a separate active device configuration associated with the console application 1080 through which application screen 1064 is displayed. Further, additional applications may be running on mobile OS 130 and displayed through separate console applications running on desktop OS 160. Mobile OS 130 may maintain additional separate active device configurations for each application running on mobile OS 130 and displayed remotely (i.e., within a user environment external to mobile computing device 110). As described above, application 1054 may include resources 1040 for various different device configurations. For example, application 1054 may include resource sets E 1072, F 1074, and G 1076 that define corresponding application screen components appropriate for different device configurations.

The active device configuration for console window 1084 includes a variety of device configuration qualifiers that may come from several different sources that define properties of the secondary terminal environment 1040, console window 1084, and/or mobile computing device 110. For example, the active device configuration for console window 1084 may include configuration qualifiers for the active display size (e.g., small, medium, large, etc.), active display orientation (e.g., portrait, landscape, etc.), active display pixel density (e.g., dpi, etc.), and/or input device configuration (e.g., touch-based, pointing device(s), hardware keyboard present, etc.). The active pixel density configuration qualifier may come from a hardware parameter associated with the display 1044 (e.g., EDID data and the like) of the secondary terminal environment. The configuration qualifiers for the active device configuration associated with application 1054 may be generated by mobile OS 130 by determining the various hardware components of secondary terminal environment 1040, various parameters associated with console application 1080, and/or other information provided by secondary terminal environment 1040 (e.g., sensor data, etc.).

As discussed above, resources of application 1054 are selected for application screen 1064 based on the configuration qualifiers according to a predefined process for matching resources to various device configurations based on the configuration qualifiers. In FIG. 10, application screen 1064 is built using resource set E 1072. In this regard, resource set E 1072 may be the best matching resource set according to the configuration qualifiers associated with secondary terminal environment 1040 (e.g., pointing device style interface, display dpi, and the like) and/or a particular size of console window 1084 on display 1044, as discussed above.

Some device configuration parameters for the active device configuration associated with application 1054 may change dynamically during runtime of application 1054. As discussed above, a mobile OS typically displays an application screen for a particular application across the entire or substantially the entire display 116 of the mobile computing device. However, a user may resize console window 1084 according to how the user wishes to interact with the application. Re-sizing the console window 1084 has the effect of dynamically changing the display device configuration. In embodiments, mobile OS dynamically selects one or more resources sets for building a new application screen in response to console window change events.

Figure 11:
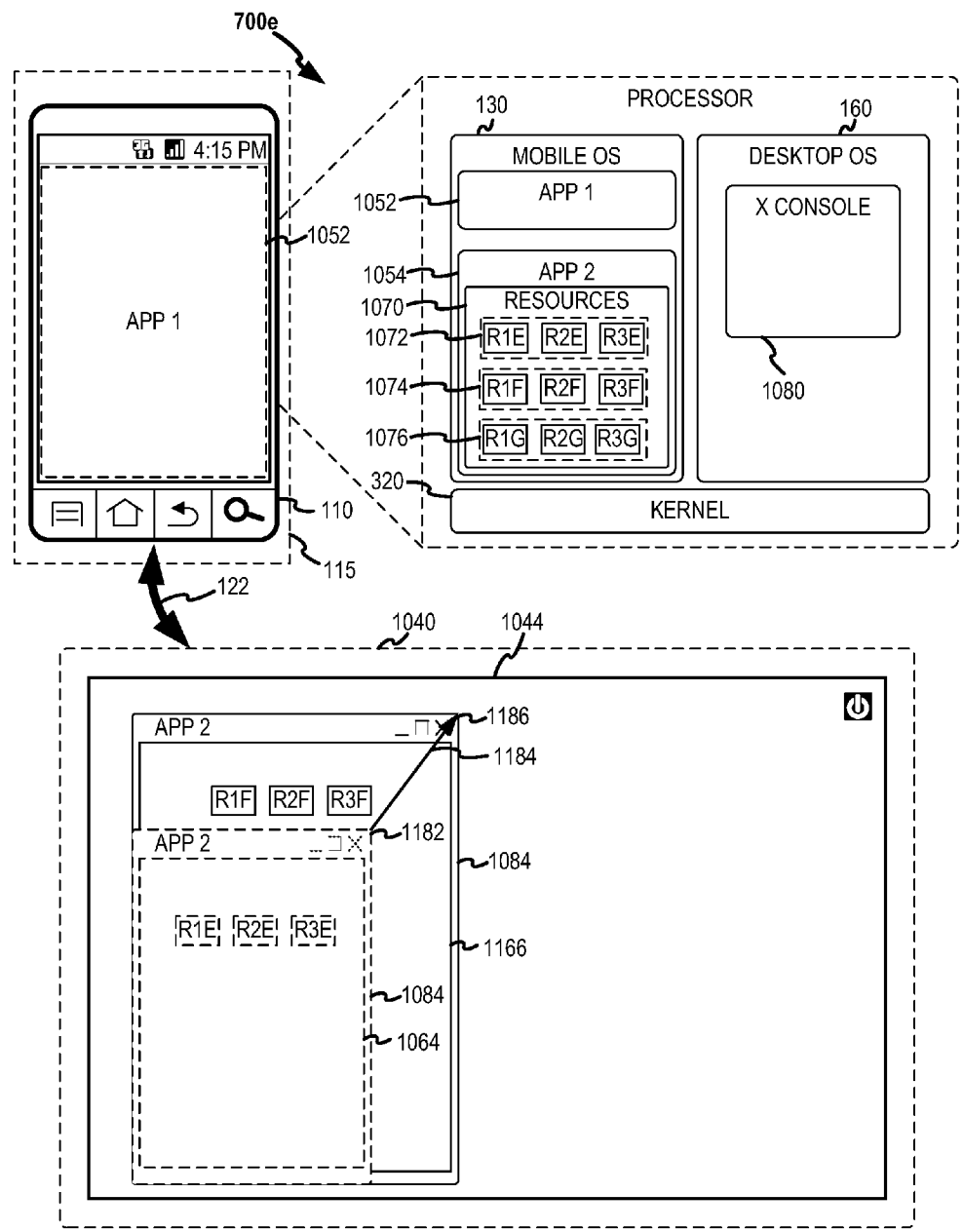
FIG. 11 illustrates a registration and drawing process flow for cross-environment remote rendering, according to various embodiments.

FIG. 11 shows computing environment 700e that illustrates aspects of dynamic cross-environment application configuration based on console window resizing, according to various embodiments. In computing environment 700e, a user resizes console window 1084 from a first display area indicated by position 1182 to a second, larger display area indicated by position 1186. For example, the user may resize the window using a drag motion on the corner of the console window as indicated by drag arrow 1184. Upon detection by console application 1080 of the window resize event, console application 1080 notifies mobile OS 130 that parameters associated with the active display size of console window 1084 have changed. Mobile OS 130 updates the display configuration qualifiers associated with console application 1080 (e.g., associated with a display identifier through which mobile OS 130 displays application 1054). Mobile OS 130 then selects resources for the application screen associated with application 1054 according to the updated display configuration qualifiers. As illustrated in FIG. 11, application screen 1166 may be built for the modified console window 1084 using resource set F 1074. For example, resource set F 1074 may be appropriate for the modified console window 1084 on display 1044 of the second user environment 1040 associated with desktop OS 160.

Figure 12:
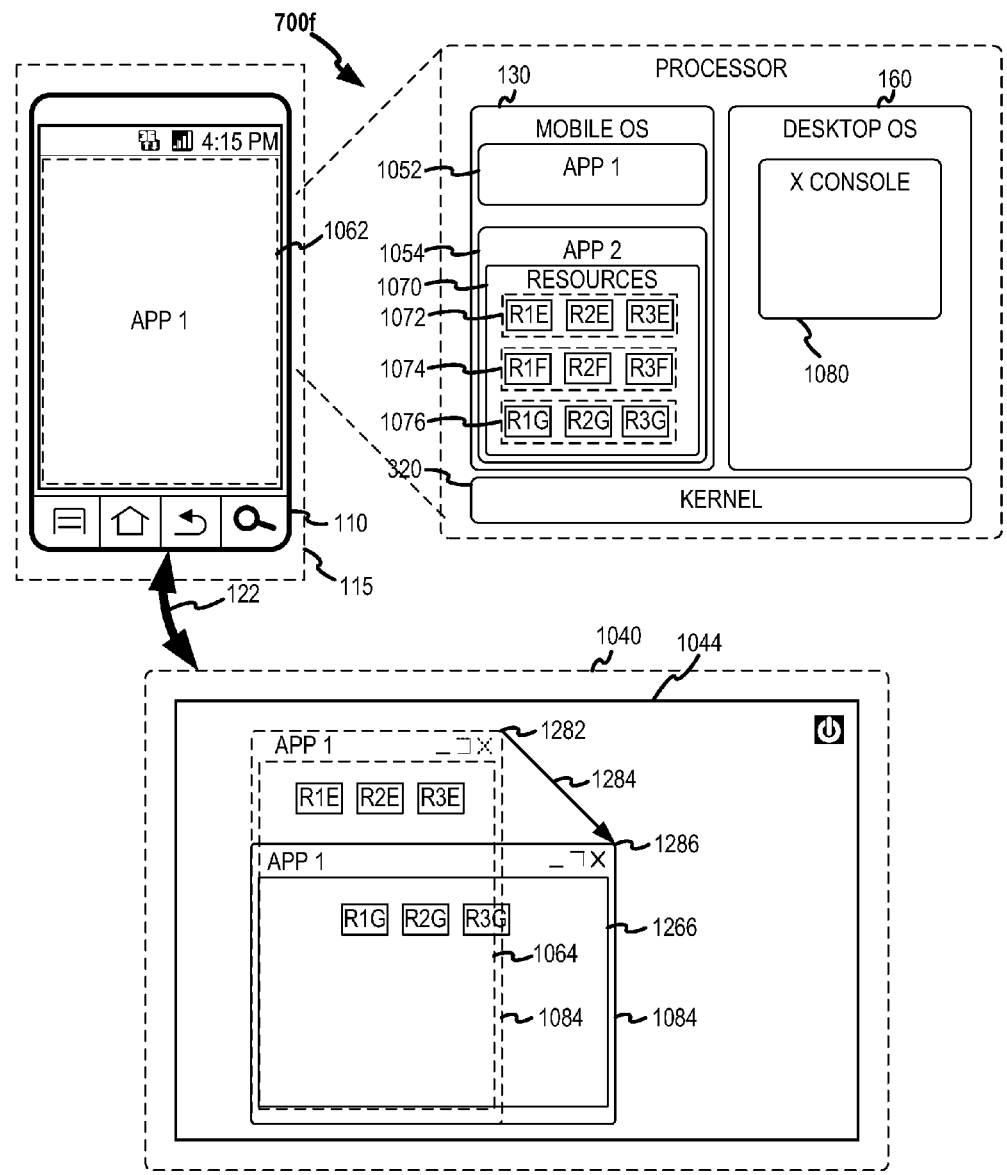
FIG. 12 shows a flow diagram of another illustrative method for cross-environment rendering in a non-extended rendering context, according to various embodiments.

FIG. 12 shows computing environment 700f that illustrates other aspects of dynamic cross-environment application configuration based on console window resizing, according to various embodiments. In computing environment 700f, a user resizes console window 1084 from a first display area indicated by position 1282 to a second, display area indicated by position 1286. For example, the user may resize the window using a drag motion on the corner of the console window as indicated by drag arrow 1284. In this instance, the resizing of the console window 1084 may have the effect of changing the aspect ratio of console window 1084. For example, the window re-sizing event indicated by arrow 1284 may transition console window 1084 from a generally portrait orientation in position 1282 to a generally landscape orientation indicated by position 1286. Mobile OS 130 updates the display configuration qualifiers associated with console application 1080. For example, mobile OS may update the orientation qualifier and/or the display size qualifiers. Mobile OS 130 then selects resources for the application screen associated with application 1054 according to the updated display configuration qualifiers. As illustrated in FIG. 12, application screen 1266 may be built for the modified console window 1084 using resource set G 1076. For example, resource set G 1076 may be appropriate for the modified console window 1084 as shown by position 1286 on display 1044 of the second user environment 1040 associated with desktop OS 160.

In embodiments, the orientation configuration qualifier associated with virtual display 1082 takes into account the orientation of the secondary terminal environment and/or the orientation of the mobile computing device 110. For example, the orientation qualifier may take into account the aspect ratio of the console window 1084 as well as an orientation of the display 1044. Alternatively, the orientation qualifier may take into account the aspect ratio of the console window 1084 as well as the orientation of mobile computing device 110 and a fixed orientation offset between the display 1044 and the mobile computing device 110.

In various embodiments, applications may be designed to implement multiple concurrent application screens. For example, a mobile computing device may have more than one built-in display device. In one embodiment, mobile computing device 110 includes two display devices 116. Applications may take advantage of the presence of multiple display devices by presenting multiple application screens concurrently for various activities of the application. For example, an application may have a list view of items on one application screen and a detail view of a selected item on the second application screen.

Figure 13:
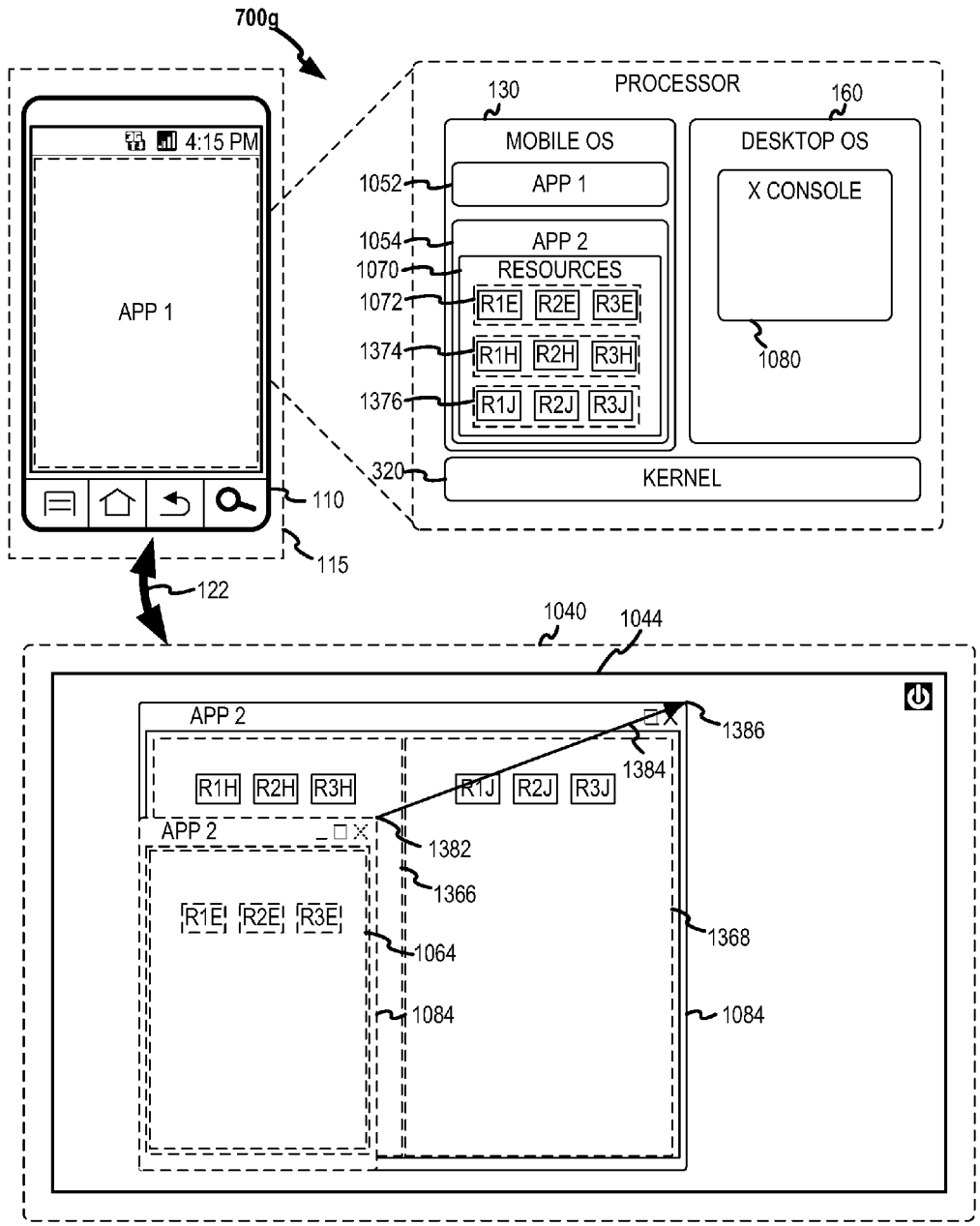
FIG. 13 illustrates operating system architecture configuration 300b for providing user interaction support to cross-environment applications, according to various embodiments.

FIG. 13 shows computing environment 700g that illustrates aspects of dynamic cross-environment application configuration that may take advantage of multiple concurrent application screens, according to various embodiments. In computing environment 700g, a user resizes console window 1084 from a first display area indicated by position 1382 to a second, display area indicated by position 1386. For example, the user may resize the window using a drag motion on the corner of the console window as indicated by drag arrow 1384. In this instance, the application 1054 may have a user setting that indicates that the application should switch to a multiple-screen mode when sufficient screen area is available. For example, the user setting could indicate that when a display area associated with the application has more than a certain display area and is in generally a landscape orientation, the application will enter the multiple-screen mode. In FIG. 13, the screen area indicated by position 1386 of console window 1084 may be sufficient for the multiple-screen mode of application 1054. In this instance, application 1054 may build a first application screen 1366 using a first resource set 1374, and a second application screen 1368 using a second resource set 1376.

Figure 14:
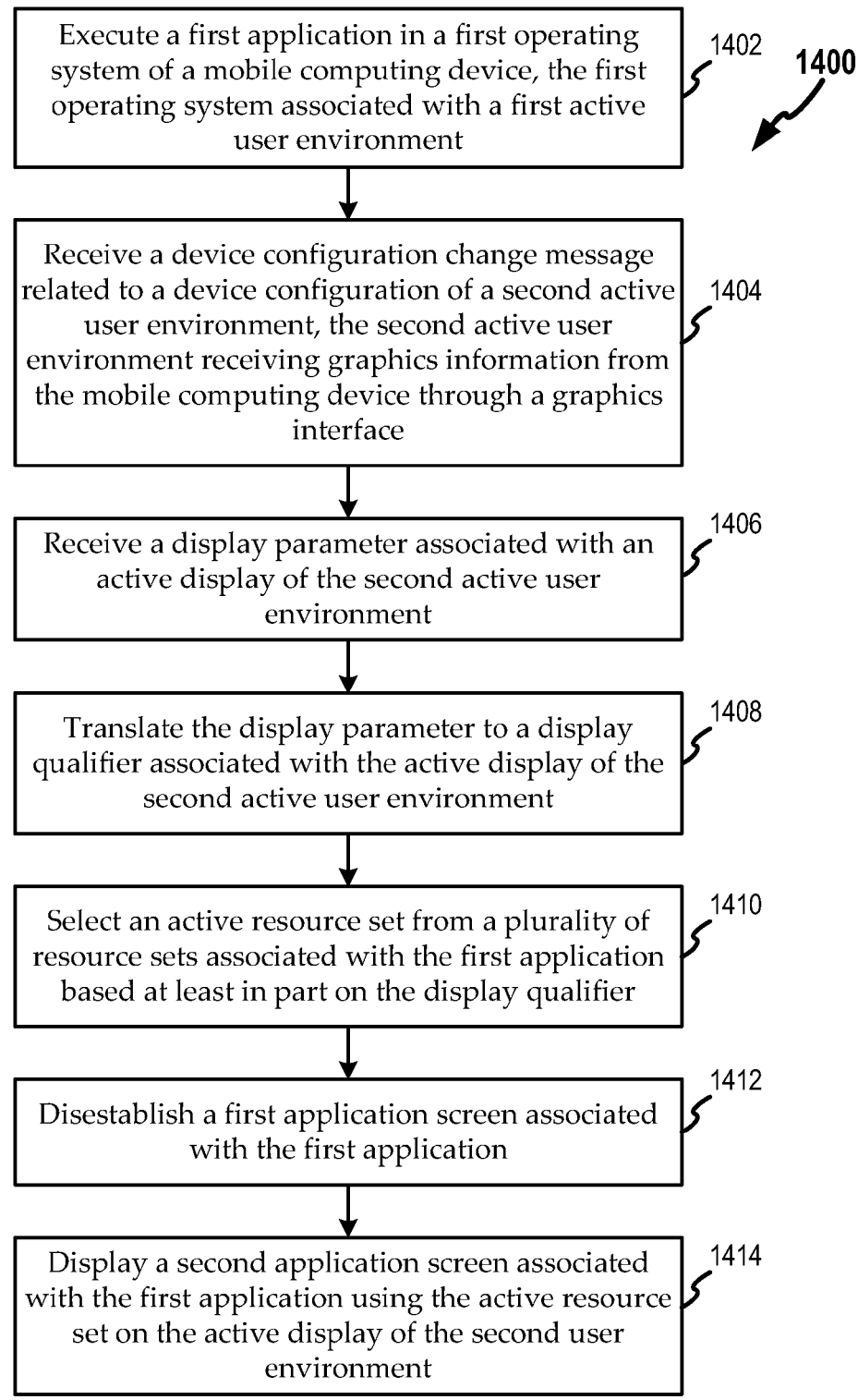
FIG. 14 illustrates aspects of user interaction support for cross-environment applications rendered using a non-extended graphics context, according to various embodiments.

FIG. 14 illustrates a process flow 1400 for dynamically configuring a cross-environment application according to aspects of dynamic application configuration described above. Process flow 1400 begins at block 1402 where a first application is executed in a first operating system of a mobile computing device. Typically, the mobile computing device defines a first active user environment. The mobile computing device may be docked with a second user environment and may provide graphics information (e.g., application screens and/or desktop screens and the like) to the second user environment through a graphics interface. The second user environment may replace the first user environment as the single active user environment, or, it may represent a second active user environment which may be interacted with concurrently with the first active user environment.

At block 1404, the mobile computing device receives a device configuration change message related to the second active user environment. The device configuration change message may be related to properties of the second active user environment and/or application presentation (e.g., application windows, etc.) within the second active user environment. At block 1406, the mobile computing device receives a display parameter associated with an active display of the second active user environment. For example, the display parameter may indicate the resolution, pixel density (e.g., dpi, etc.), and/or aspect ratio of the active display. At block 1408, the mobile OS determines a display qualifier associated with the active display of the second active user environment based on the display parameter. For example, the mobile OS may determine a display size qualifier (e.g., medium, large, xlarge, etc.) from display resolution parameters (e.g., width, height in pixels, etc.).

At block 1410, the mobile OS selects an active resource set from the available resource sets based at least in part on the display qualifier. The mobile OS then disestablishes a first application screen associate with the first application at block 1412. Using the active resource set selected at block 1410, the mobile OS then builds and displays a second application screen at block 1414 on the active display of the second active user environment.

FIG. 15 illustrates a process flow 1500 for dynamically configuring orientation of a cross-environment application according to aspects of dynamic application configuration described above. In process flow 1500, a first application and a second application are in active concurrent execution in a first OS (e.g., mobile OS) of a mobile computing device associated with a first active user environment, as indicated by block 1502. At block 1504, the first OS receives a first orientation indicator from a first orientation sensor associated with the first active user environment. For example, the mobile computing device may include the first orientation sensor. At block 1506, the first OS determines a first orientation qualifier associated with an active display of the first active user environment based on the first orientation indicator. The first OS uses the first orientation qualifier at block 1508 to select a first resource set for the first application from the available resource sets of the first application based on the orientation qualifier. The first OS then displays a first application screen established with the first resource set on a first display of the first active user environment.

At block 1512, the first OS associates a second orientation qualifier with a second active display of a second active user environment. As such, orientation configuration of applications displayed on the second active display of the second active user environment is disassociated from the first orientation qualifier. In embodiments, the second orientation qualifier may be determined from parameters received from a second orientation sensor associated with the second active user environment, or from default settings associated with the second active user environment, or from parameters associated with application windows displayed within the second display. At block 1514, the first OS selects a second resource set for the second application from the available resource sets of the second application based on the second orientation qualifier. A second application screen associated with the second application is established using the second resource set and displayed on the second display at block 1516. Using this process flow, dynamic orientation of multiple applications is maintained across multiple active user environments to provide a more seamless computing experience.

The foregoing description has been presented for purposes of illustration and description. Furthermore, the description is not intended to limit embodiments of the invention to the form disclosed herein. While a number of exemplary aspects and embodiments have been discussed above, those of skill in the art will recognize certain variations, modifications, permutations, additions, and sub-combinations thereof.

The various operations of methods described above may be performed by any suitable means capable of performing the corresponding functions. The means may include various hardware and/or software component(s) and/or module(s), including, but not limited to a circuit, an application specific integrated circuit (ASIC), or processor.

The various illustrative logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The functions described may be implemented in hardware, software, firmware, or any combination thereof. If implemented in software, the functions may be stored as one or more instructions on a tangible computer-readable medium. A storage medium may be any available tangible medium that can be accessed by a computer. By way of example, and not limitation, such computer-readable media can comprise RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material.

Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A method for configuring a first application and a second application, both compiled for and in active concurrent execution within a first operating system of a mobile computing device, the mobile computing device associated with a first active user environment, the method comprising:
receiving a first orientation indicator with respect to gravity from a first orientation sensor, the first orientation sensor associated with the first active user environment;
translating the first orientation indicator into a first orientation qualifier associated with an active display of the first active user environment;
selecting a first resource set for the first application from a first plurality of resource sets associated with the first application based on the first orientation qualifier;
establishing a first application screen associated with the first application using the first resource set;
displaying the first application screen on a first display of the first active user environment;
receiving a second orientation indicator from a second orientation sensor, the second orientation sensor associated with a second active user environment associated with a desktop computing system;
translating the second orientation indicator into a second orientation qualifier;

associating the second orientation qualifier with a second active display of the second active user environment;

disassociating an orientation configuration of the second application on the second active display from the first orientation qualifier;

selecting a second resource set for the second application from a second plurality of resource sets associated with the second application based on the second orientation qualifier;

establishing a second application screen associated with the second application using the second resource set; and displaying the second application screen on the second active display;

wherein the second active user environment is associated with a second operating system, the second operating system running concurrently with the first operating system on a shared kernel of the mobile computing device, wherein the first operating system and the second operating system make system calls through the shared kernel without virtualized memory, wherein the shared kernel allocates anonymous shared memory comprising named memory blocks, the anonymous shared memory accessible by all processes running on the first operating system and a second operating system and not accessible by name by other processes, and wherein the mobile computing device and the desktop computing system are distinct computing devices.

2. The method of claim 1, wherein the anonymous shared memory is accessible by name through a file descriptor.

3. The method of claim 1, further comprising an IPC driver which passes a file descriptor to processes in the first operating system and the second operating system to allow communication between the first operating system and the second operating system across process boundaries.

4. The method of claim 1, further comprising translating the first orientation indicator into the second orientation qualifier based on an orientation offset.

5. The method of claim 1, wherein the shared kernel manages task scheduling for processes of the both the first operating system and the second operating system.

6. The method of claim 5, wherein the first operating system comprises a mobile operating system and the second operating system comprises a desktop operating system.

7. The method of claim 5, wherein the first operating system comprises an Android mobile operating system and the second operating system comprises a Linux desktop operating system.

8. A method for configuring a first application and a second application, both compiled for and in active concurrent execution within a first operating system of a mobile computing device, the mobile computing device associated with a first active user environment, the method comprising:

receiving a first orientation indicator with respect to gravity from a first orientation sensor, the first orientation sensor associated with the first active user environment;

associating a first orientation qualifier with the first orientation indicator;

selecting a first resource set for the first application from a first plurality of resource sets associated with the first application based on the first orientation qualifier;

receiving a second orientation indicator from a second orientation sensor, the second orientation sensor associated with a second active user environment associated with a desktop computing system;

translating the second orientation indicator into a second orientation qualifier;

disassociating the second orientation qualifier from the first orientation indicator; and selecting a second resource set for the second application from a second plurality of resource sets associated with the second application based on the second orientation qualifier;

wherein the second active user environment is associated with a second operating system, the second operating system running concurrently with the first operating system on a shared kernel of the mobile computing device, wherein the first operating system and the second operating system make system calls through the shared kernel without virtualized memory, and wherein the shared kernel allocates anonymous shared memory comprising named memory blocks, the anonymous shared memory accessible by all processes running on the first operating system and a second operating system and not accessible by name by other processes.

9. The method of claim 8, further comprising:

establishing a first application screen associated with the first application using the first resource set;

displaying the first application screen on a first display of the first active user environment;

establishing a second application screen associated with the second application using the second resource set; and displaying the second application screen on a second display of a second active user environment.

10. The method of claim 9, wherein the anonymous shared memory is accessible by name through a file descriptor.

11. The method of claim 10, further comprising an IPC driver which passes the file descriptor to processes in the first operating system and the second operating system to allow communication between the first operating system and the second operating system across process boundaries.

12. The method of claim 8, further comprising translating a device configuration parameter of a second active user environment into the second orientation qualifier.

13. The method of claim 8, wherein the second orientation qualifier is based on an aspect ratio of a display device associated with a second active user environment.

14. A method for configuring a first application and a second application, both compiled for and in active concurrent execution within a first operating system of a mobile computing device, the mobile computing device associated with a first active user environment, the method comprising:

receiving a first orientation indicator from a first orientation sensor, the first orientation sensor associated with the first active user environment;

receiving a device configuration change message, the device configuration change message related to a device configuration of a second active user environment, the second active user environment receiving graphics information from the mobile computing device through a graphics interface;

translating the first orientation indicator into a first orientation qualifier for a first active application screen associated with the first application;

selecting a first resource set for the first application from a first plurality of resource sets associated with the first application based on the first orientation qualifier;

translating the device configuration change message into a second orientation qualifier for a second active application screen associated with the second application; and selecting a second resource set for the second application from a second plurality of resource sets associated with the second application based on the second orientation qualifier;

wherein the second active user environment is associated with a second operating system, the second operating system running concurrently with the first operating system on a shared kernel of the mobile computing device, wherein the first operating system and the second operating system make system calls through the shared kernel without virtualized memory, wherein the shared kernel allocates anonymous shared memory comprising named memory blocks, the anonymous shared memory accessible by all processes running on the first operating system and a second operating system and not accessible by name by other processes, and wherein the mobile computing device and the desktop computing system are distinct computing devices.

15. The method of claim 14, wherein the device configuration change message is received from a console application running in a second operating system.

16. The method of claim 15, wherein the device configuration change message indicates a change to an aspect ratio of a console window associated with the console application.

17. The method of claim 14, wherein the first orientation indicator is with respect to gravity.

18. The method of claim 14, wherein the first operating system comprises a mobile operating system and the second operating system comprises a desktop operating system.

19. The method of claim 14, wherein the first operating system comprises an Android mobile operating system and the second operating system comprises a Linux desktop operating system.

20. The method of claim 14, further comprising:
establishing a first application screen associated with the first application using the first resource set;
displaying the first application screen on a first display of the first active user environment;
establishing a second application screen associated with the second application using the second resource set; and
displaying the second application screen on a second display of the second active user environment.

* * * * *